(12) United States Patent
Segev et al.

(10) Patent No.: US 11,019,586 B2
(45) Date of Patent: *May 25, 2021

(54) ACCESS POINT (AP), STATION (STA) AND METHOD OF MULTI-USER (MU) LOCATION MEASURMENT

(71) Applicant: Intel IP Corporation, Santa Clara, CA (US)

(72) Inventors: Jonathan Segev, Sunnyvale, CA (US); Yaron Alpert, Hod Hasharoni (IL); Chittabrata Ghosh, Fremont, CA (US); Assaf Kasher, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,542

(22) Filed: Nov. 19, 2019

(65) Prior Publication Data

US 2020/0107282 A1  Apr. 2, 2020

Related U.S. Application Data

(63) Continuation of application No. 15/472,463, filed on Mar. 29, 2017, now Pat. No. 10,512,047.

(Continued)

(51) Int. Cl.
*H04W 56/00* (2009.01)
*H04J 11/00* (2006.01)
(Continued)

(52) U.S. Cl.
CPC .......... *H04W 56/001* (2013.01); *H04B 17/27* (2015.01); *H04J 11/0073* (2013.01);
(Continued)

(58) Field of Classification Search
CPC ............ H04W 56/001; H04W 72/048; H04W 72/1268; H04W 72/0406; H04W 52/146;
(Continued)

(56) References Cited

U.S. PATENT DOCUMENTS 5,896,411 A    4/1999   Ali et al.
10,512,047 B2   12/2019   Segev et al.
(Continued)

OTHER PUBLICATIONS

"U.S. Appl. No. 15/472,463, Examiner Interview Summary dated Aug. 8, 2019", 3 pgs.

(Continued)

*Primary Examiner* — Ricardo H Castaneyra
(74) *Attorney, Agent, or Firm* — Schwegman Lundberg & Woessner, P.A.

(57) ABSTRACT

Embodiments of an access point (AP), station (STA) and method for multi-user (MU) location measurement are generally described herein. The AP may contend for a transmission opportunity (TXOP) to obtain access to a channel. The AP may transmit a trigger frame (TF) to initiate a multi-user (MU) location measurement during the TXOP. The AP may receive service requests for the MU location measurement from a plurality of STAs. The AP may transmit an MU acknowledgement (ACK) frame that indicates reception of the service requests. The AP may receive, from the STAs, uplink sounding frames that include per-STA timing information for the service requests and the MU ACK frame. The STA may determine location measurements for the STAs based on the per-STA timing information included in the uplink sounding frames.

20 Claims, 15 Drawing Sheets

Related U.S. Application Data

(60) Provisional application No. 62/315,242, filed on Mar. 30, 2016, provisional application No. 62/315,248, filed on Mar. 30, 2016.

(51) Int. Cl.
| | |
|---|---|
| *H04W 72/04* | (2009.01) |
| *H04L 5/00* | (2006.01) |
| *H04W 72/12* | (2009.01) |
| *H04B 17/27* | (2015.01) |
| *H04W 52/14* | (2009.01) |
| *H04W 84/12* | (2009.01) |

(52) U.S. Cl.
CPC ......... *H04L 5/0055* (2013.01); *H04W 72/048* (2013.01); *H04W 72/1268* (2013.01); *H04W 52/146* (2013.01); *H04W 84/12* (2013.01)

(58) Field of Classification Search
CPC ....... H04W 84/12; H04W 24/10; H04W 4/70; H04B 17/27; H04J 11/0073; H04L 5/0055; H04L 5/0051; H04L 5/0007; H04L 5/0053; H04L 25/0224
See application file for complete search history.

(56) References Cited

U.S. PATENT DOCUMENTS

| | | |
|---|---|---|
| 2004/0176111 A1 | 9/2004 | Wilhelm |
| 2014/0335885 A1 | 11/2014 | Steiner et al. |
| 2016/0277196 A1 | 9/2016 | Jose et al. |
| 2016/0330732 A1 | 11/2016 | Moon et al. |
| 2016/0366548 A1 | 12/2016 | Wang et al. |
| 2017/0064708 A1 | 3/2017 | Noh et al. |
| 2017/0289933 A1 | 10/2017 | Segev et al. |
| 2018/0063867 A1 | 3/2018 | Sugaya et al. |

OTHER PUBLICATIONS

"U.S. Appl. No. 15/472,463, Final Office Action dated Jun. 17, 2019", 13 pgs.

"U.S. Appl. No. 15/472,463, Non Final Office Action dated Nov. 14, 2018", 45 pgs.

"U.S. Appl. No. 15/472,463, Notice of Allowance dated Aug. 12, 2019", 12 pgs.

"U.S. Appl. No. 15/472,463, Response filed Mar. 14, 2019 to Non Final Office Action dated Nov. 14, 2018", 13 pgs.

"U.S. Appl. No. 15/472,463, Response filed Jul. 29, 2019 to Final Office Action dated Jun. 17, 2019", 11 pgs.

ACCESS POINT (AP), STATION (STA) AND METHOD OF MULTI-USER (MU) LOCATION MEASURMENT

PRIORITY CLAIM

This application is a continuation of U.S. patent application Ser. No. 15/472,463, filed Mar. 29, 2017, which claims priority under 35 USC 119(e) to U.S. Provisional Patent Application Ser. No. 62/315,242, filed Mar. 30, 2016 [reference number P97440Z (9884.003PRV)] and U.S. Provisional Patent Application Ser. No. 62/315,248, filed Mar. 30, 2016 [reference number P97441Z (9884.004PRV)], all of which are incorporated herein by reference in their entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG). Some embodiments relate to high-efficiency (HE) wireless or high-efficiency WLAN or Wi-Fi communications. Some embodiments relate to channel access. Some embodiments relate to spatial reuse. Some embodiments relate to channel access in accordance with omni-directional and/or directional patterns.

BACKGROUND

Wireless communications have been evolving toward ever increasing data rates (e.g., from IEEE 802.11a/g to IEEE 802.11n to IEEE 802.11ac and IEEE 802.11ad). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios. In addition, IEEE 802.11ad, IEEE 802.11ay and/or other technologies may be used in these and other scenarios, in some cases.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
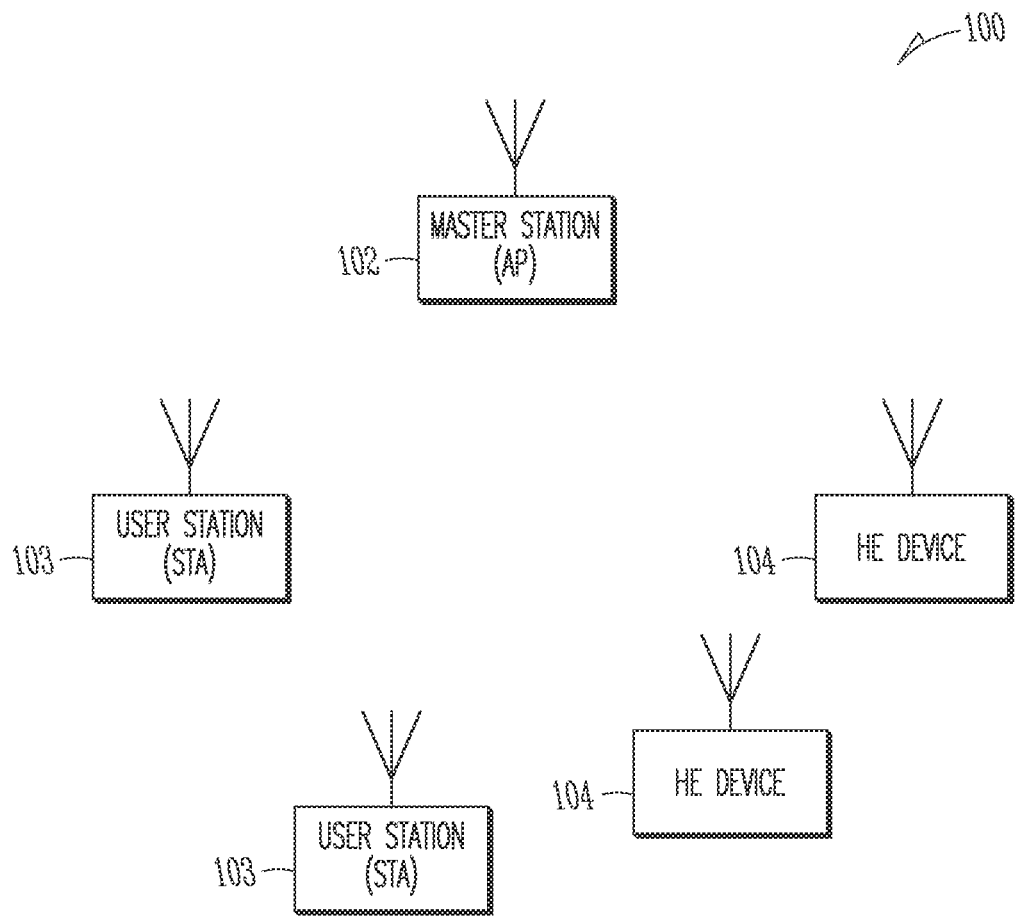
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support MU operation (for example HE) devices in some cases, non MU operation devices in some cases, and a combination of MU operation devices and non MU operation devices in some cases. Accordingly, it is understood that although techniques described herein may refer to either a non MU operation device or to an MU operation device, such techniques may be applicable to both non MU operation devices and MU operation devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may receive and/or detect signals from one or more STAs 103, and may transmit data packets to one or more STAs 103. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, an MU operation device (device capable of MU operation), an HE device 104 and/or other device may be configurable to operate as a master station. Accordingly, in such embodiments, operations that may be performed by the AP 102 as described herein may be performed by the STA 103, an MU operation device, an HE device 104 and/or other device that is configurable to operate as the master station.

In some embodiments, one or more of the STAs 103 may be legacy stations (for instance, a non MU operation device and/or device not capable of MU operation). These embodiments are not limiting, however, as the STAs 103 may be configured to operate as MU operation devices, HE devices 104 or may support MU operation or may support HE operation, in some embodiments. The master station 102 may be arranged to communicate with the STAs 103 and/or the HE stations and/or the MU operation stations in accordance with one or more of the IEEE 802.11 standards, including 802.11ax and/or others. In accordance with some HE operation embodiments and/or MU operation embodiments, an access point (AP) may operate as the master station 102 and may be arranged to contend for a wireless medium (e.g., during a contention period) to receive exclusive control of the medium for an 802.11 air access control period (i.e., a transmission opportunity (TXOP)). The master station 102 may, for example, transmit a master-sync or control transmission at the beginning of the 802.11 air access control period (including but not limited to an HE control period) to indicate, among other things, which MU operation stations and/or HE stations 104 are scheduled for communication during the 802.11 air access control period. During the 802.11 air access control period, the scheduled MU operation stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the 802.11 air access control period, the master station 102 may communicate with HE stations 104 using one or more MU PPDUs. During the 802.11 air access control period, STAs 103 not operating as MU operation devices may refrain from communicating in some cases. In some embodiments, the master-sync transmission may be referred to as a control and schedule transmission.

In some embodiments, the multiple-access technique used during the 802.11 air access control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique or combination of the above. These multiple-access techniques used during the 802.11 air access control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the MU operation stations and/or HE stations 104 outside the 802.11 air access control period in accordance with legacy IEEE 802.11 communication techniques, although this is not a requirement.

In some embodiments, the MU communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an MU communication may be configured for transmitting a number of spatial streams.

In some embodiments, MU techniques may be used, although the scope of embodiments is not limited in this respect. As an example, techniques included in 802.11ax standards and/or other standards may be used. In accordance with some embodiments, a master station 102 and/or MU operation stations and/or HE stations 104 may generate an MU packet in accordance with a short preamble format or a long preamble format. The MU packet may comprise a legacy signal field (L-SIG) followed by one or more MU signal fields (HE-SIG) and an MU long-training field (MU-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
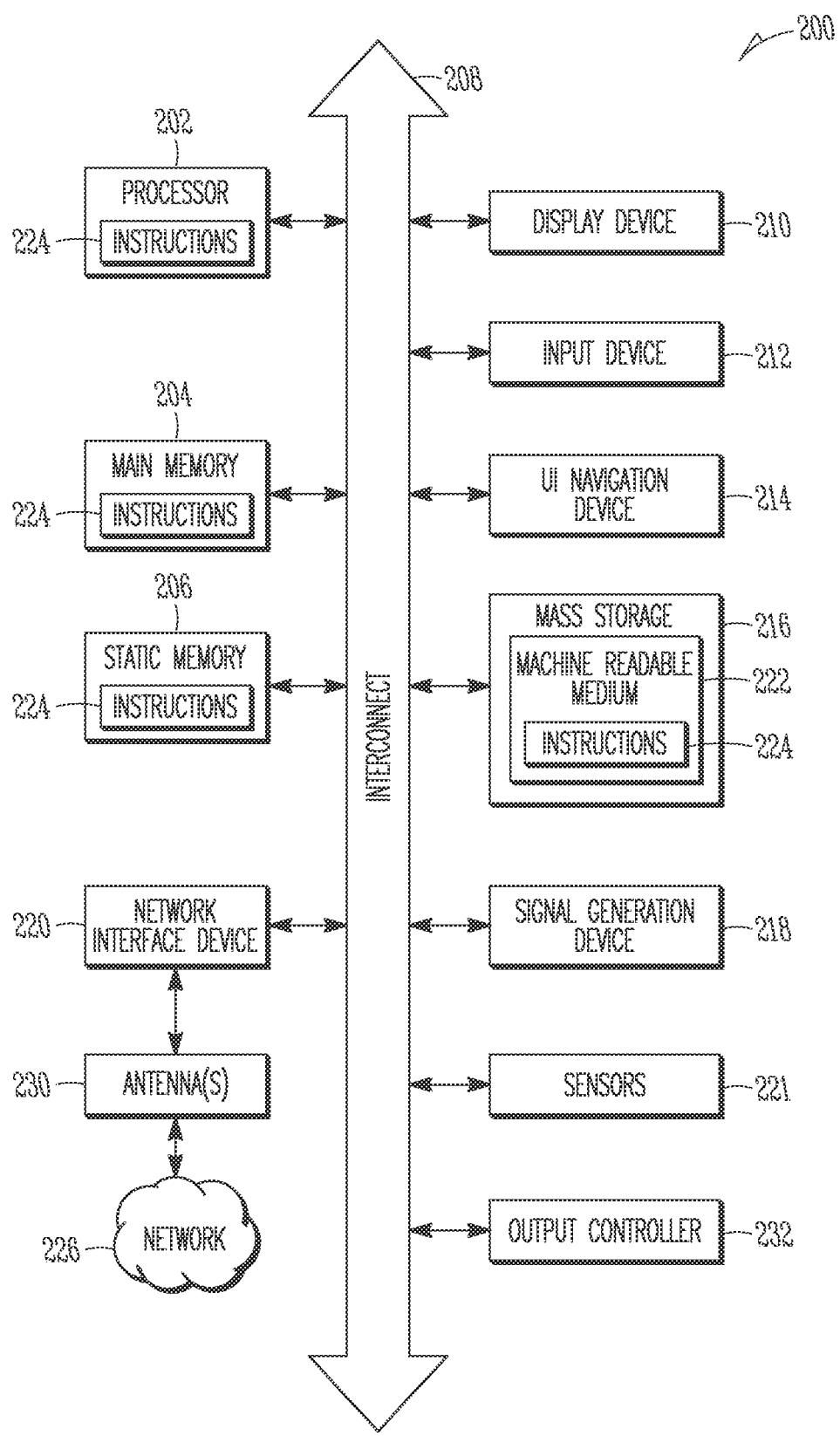
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HE device, HE AP, HE STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques, OFDMA techniques and combination. The term "transmission medium" shall be taken to include any intangible medium that is capable of storing, encoding or carrying instructions for execution by the machine 200, and includes digital or analog communications signals or other intangible medium to facilitate communication of such software.

Figure 3:
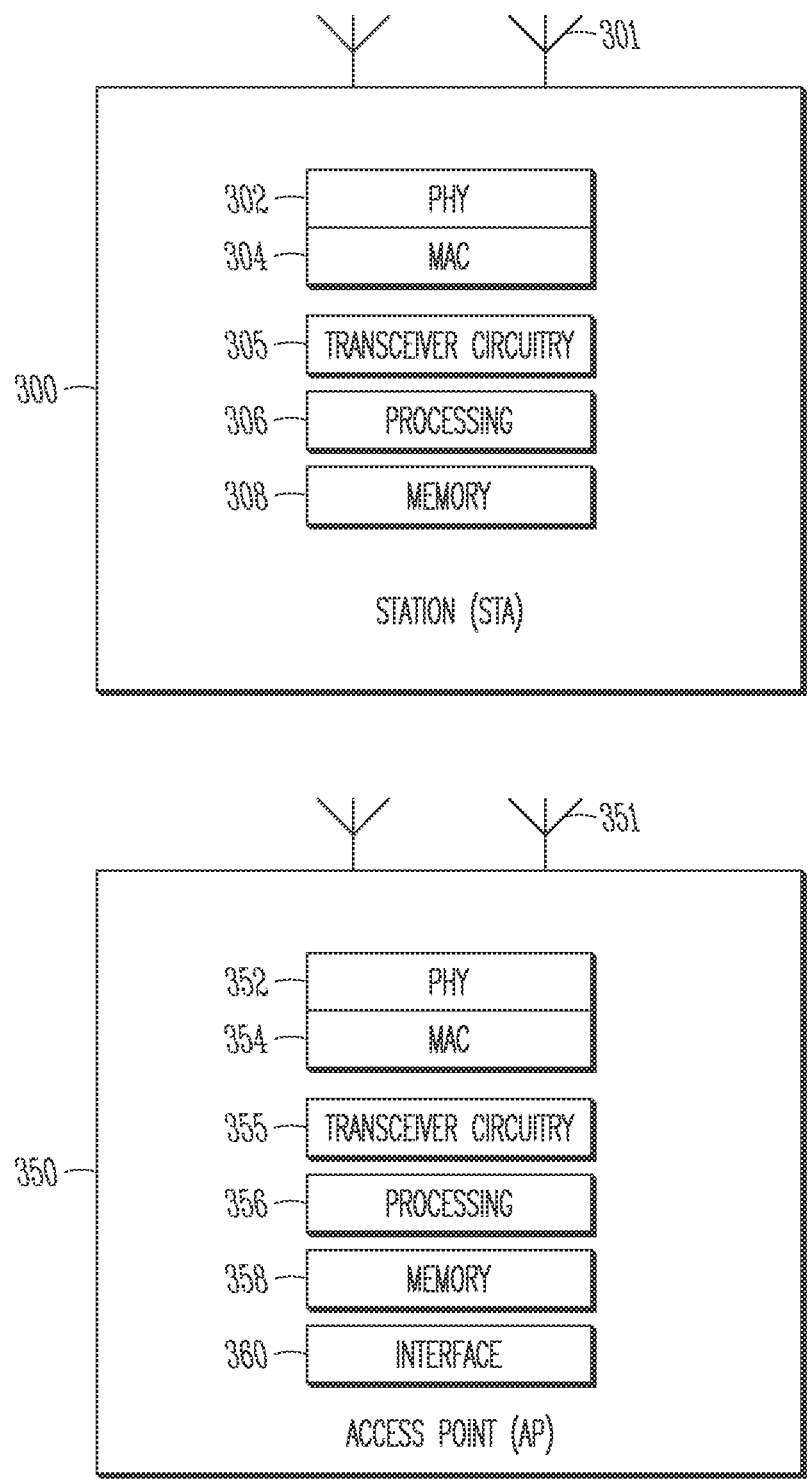
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HE device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HE device 104 may be configured to communicate using OFDM communication signals over a multicarrier communication channel. Accordingly, in some cases, the STA 300, AP 350 and/or HE device 104 may be configured to receive signals in accordance with specific communication standards, such as the Institute of Electrical and Electronics Engineers (IEEE) standards including IEEE 802.11-2012, 802.11n-2009 and/or 802.11ac-2013 and/or 802.11ad and/or 802.11ah standards and/or proposed specifications for WLANs including proposed HE standards, although the scope of the embodiments is not limited in this respect as they may also be suitable to transmit and/or receive communications in accordance with other techniques and standards. In some other embodiments, the AP 350, HE device 104 and/or the STA 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

Figure 4:
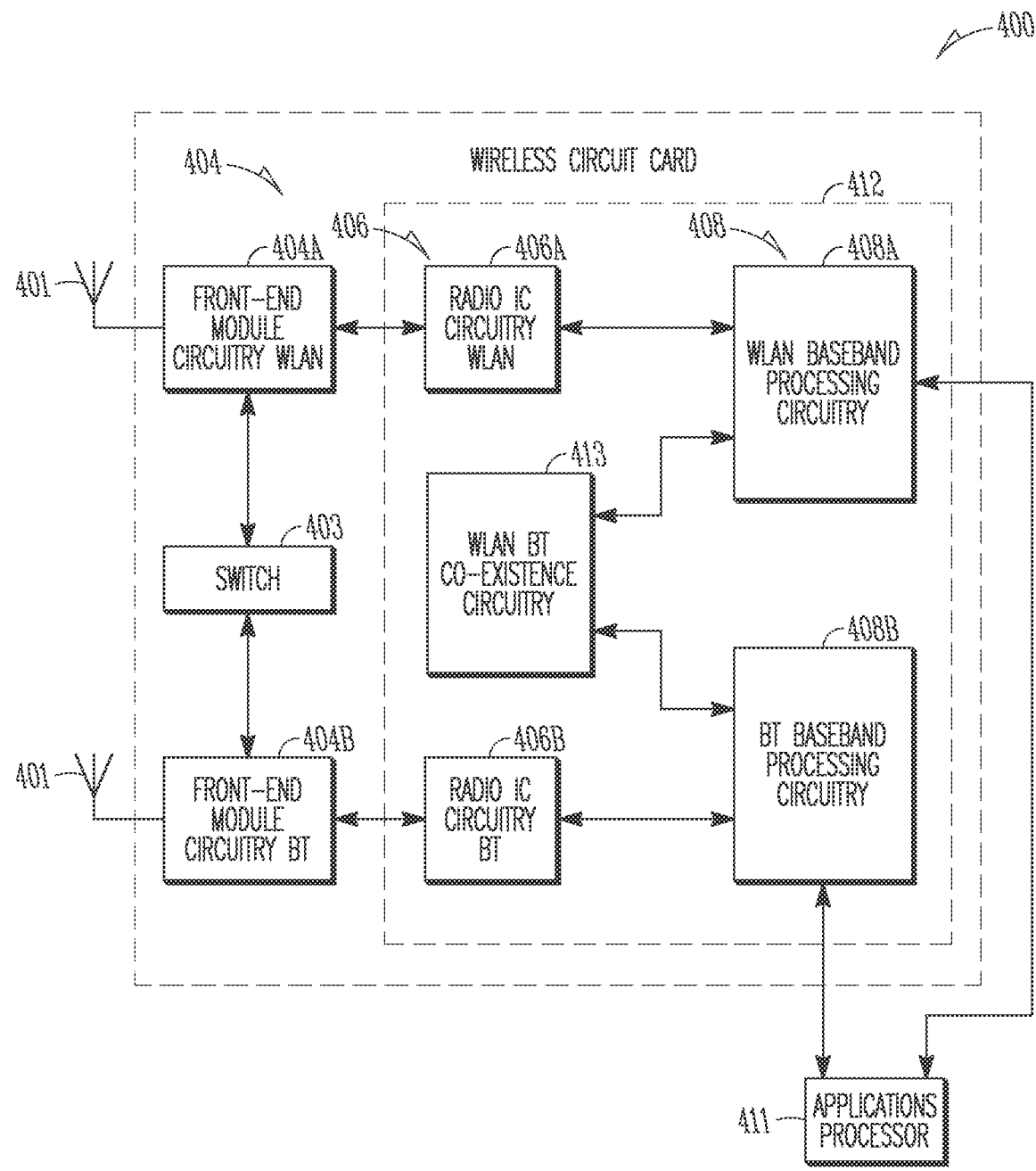
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 404 may include a WLAN or Wi-Fi FEM circuitry 404A and a Bluetooth (BT) FEM circuitry 404B. The WLAN FEM circuitry 404a may include a receive signal path comprising circuitry configured to operate on WLAN RF signals received from one or more antennas 401, to amplify the received signals and to provide the amplified versions of the received signals to the WLAN radio IC circuitry 406A for further processing. The BT FEM circuitry 404B may include a receive signal path which may include circuitry configured to operate on BT RF signals received from one or more antennas 401, to amplify the received signals and to provide the amplified versions of the received signals to the BT radio IC circuitry 406B for further processing. FEM circuitry 404A may also include a transmit signal path which may include circuitry configured to amplify WLAN signals provided by the radio IC circuitry 406A for wireless transmission by one or more of the antennas 401. In addition, FEM circuitry 404B may also include a transmit signal path which may include circuitry configured to amplify BT signals provided by the radio IC circuitry 406B for wireless transmission by the one or more antennas. In the embodiment of FIG. 4, although FEM 404A and FEM 404B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406A and BT radio IC circuitry 406B. The WLAN radio IC circuitry 406a may include a receive signal path which may include circuitry to down-convert WLAN RF signals received from the FEM circuitry 404A and provide baseband signals to WLAN baseband processing circuitry 408A. BT radio IC circuitry 406B may in turn include a receive signal path which may include circuitry to down-convert BT RF signals received from the FEM circuitry 404B and provide baseband signals to BT baseband processing circuitry 408B. WLAN radio IC circuitry 406A may also include a transmit signal path which may include circuitry to up-convert WLAN baseband signals provided by the WLAN baseband processing circuitry 408a and provide WLAN RF output signals to the FEM circuitry 404A for subsequent wireless transmission by the one or more antennas 401. BT radio IC circuitry 406B may also include a transmit signal path which may include circuitry to up-convert BT baseband signals provided by the BT baseband processing circuitry 408B and provide BT RF output signals to the FEM circuitry 404B for subsequent wireless transmission by the one or more antennas 401. In the embodiment of FIG. 4, although radio IC circuitries 406A and 406B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 408 may include a WLAN baseband processing circuitry 408A and a BT baseband processing circuitry 408B. The WLAN baseband processing circuitry 408A may include a memory, such as, for example, a set of RAM arrays in a Fast Fourier Transform or Inverse Fast Fourier Transform block (not shown) of the WLAN baseband processing circuitry 408A. Each of the WLAN baseband circuitry 408A and the BT baseband circuitry 408B may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408A and 408B may further include physical layer (PHY) and medium access control layer (MAC) circuitry, and may further interface with application processor 411 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408A and the BT baseband circuitry 408B to enable use cases requiring WLAN and BT coexistence. In addition, a switch 403 may be provided between the WLAN FEM circuitry 404a and the BT FEM circuitry 404B to allow switching between the WLAN and BT radios according to application needs. In addition, although the antennas 401 are depicted as being respectively connected to the WLAN FEM circuitry 404A and the BT FEM circuitry 404B, embodiments include within their scope the sharing of one or more antennas as between the WLAN and BT FEMs, or the provision of more than one antenna connected to each of FEM 404A or 404B.

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of a Wi-Fi communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2016, 802.11n-2009, 802.11ac, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency (HE) Wi-Fi (HEW) communications in accordance with the IEEE 802.11ax standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 4, the radio architecture 400 may be configured to establish a BT synchronous connection oriented (SCO) link and/or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards.

In some embodiments, the radio-architecture 400 may include other radio cards, such as a cellular radio card configured for cellular (e.g., 3GPP such as LTE, LTE-Advanced or 5G communications).

In some IEEE 802.11 embodiments, the radio architecture 400 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 5:
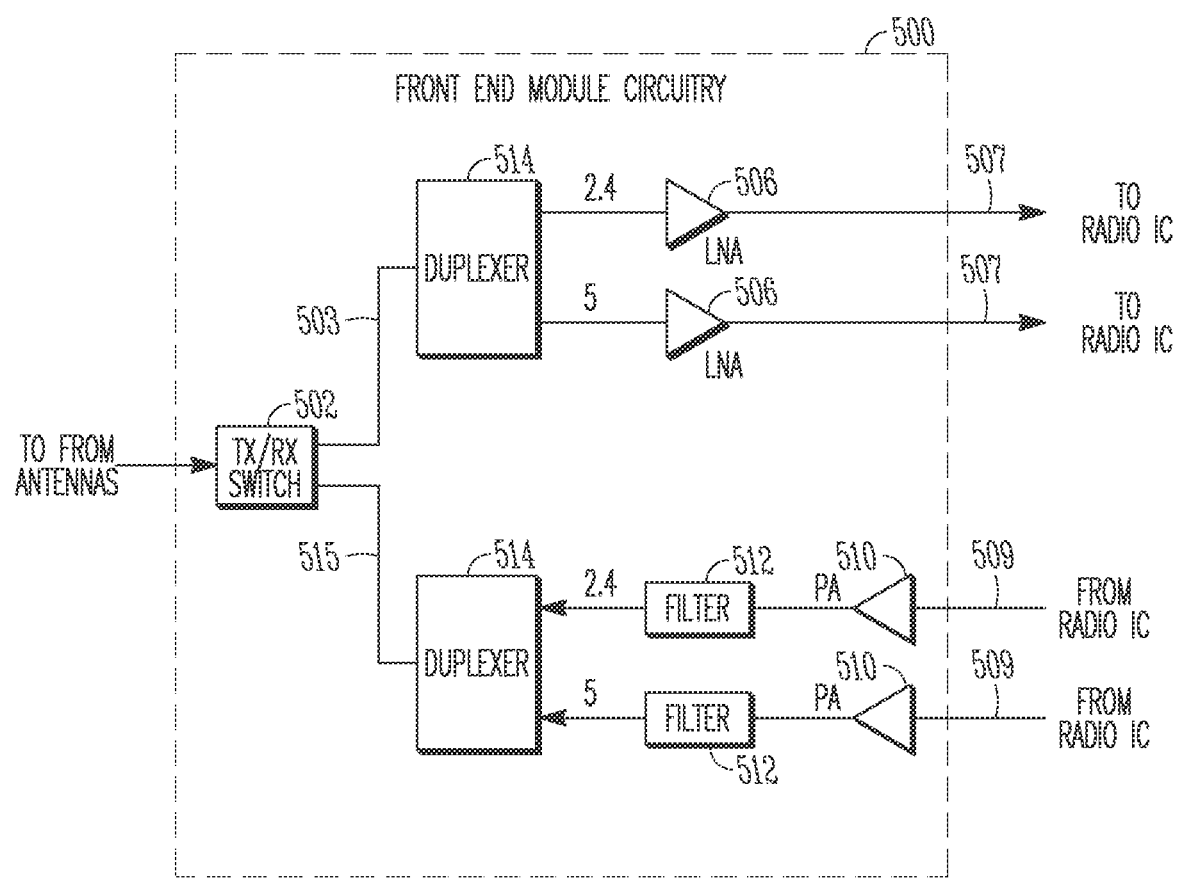
FIG. 5 illustrates a front-end module circuitry for use in the radio architecture of FIG. 4 in accordance with some embodiments.

FIG. 5 illustrates FEM circuitry 500 in accordance with some embodiments. The FEM circuitry 500 is one example of circuitry that may be suitable for use as the WLAN and/or BT FEM circuitry 404A/404B (FIG. 4), although other circuitry configurations may also be suitable.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) 510 to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

Figure 6:
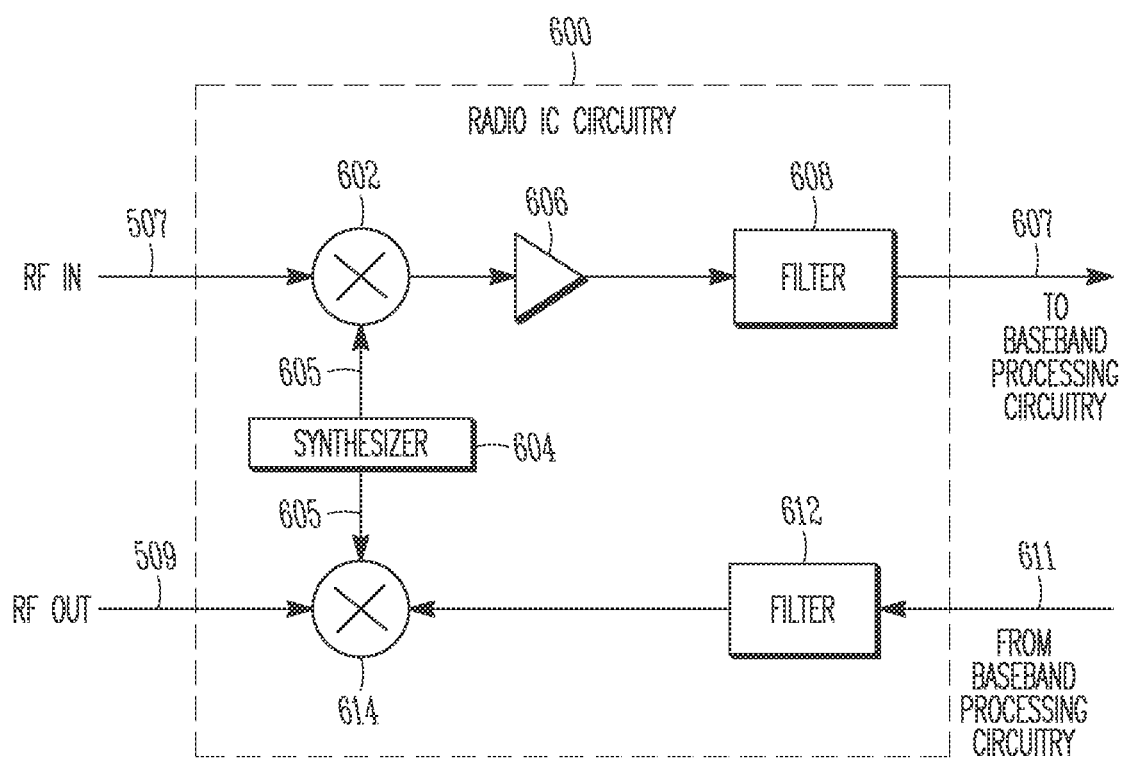
FIG. 6 illustrates a radio IC circuitry for use in the radio architecture of FIG. 4 in accordance with some embodiments.

FIG. 6 illustrates radio IC circuitry 600 in accordance with some embodiments. The radio IC circuitry 600 is one example of circuitry that may be suitable for use as the WLAN or BT radio IC circuitry 406A/406B (FIG. 4), although other circuitry configurations may also be suitable.

In some embodiments, the radio IC circuitry 600 may include a receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 602 and/or 614 may each include one or more mixers, and filter circuitries 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify the down-converted signals and the filter circuitry 608 may include a LPF configured to remove unwanted signals from the down-converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor.

Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, or a synthesizer comprising a phase-locked loop with a frequency divider. According to some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 604 may be provided by a voltage controlled oscillator (VCO), although that is not a requirement. A divider control input may further be provided by either the baseband processing circuitry 408 (FIG. 4) or the application processor 411 (FIG. 4) depending on the desired output frequency 605. In some embodiments, a divider control input (e.g., N) may be determined from a look-up table (e.g., within a Wi-Fi card) based on a channel number and a channel center frequency as determined or indicated by the application processor 411.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency ($f_{LO}$).

Figure 7:
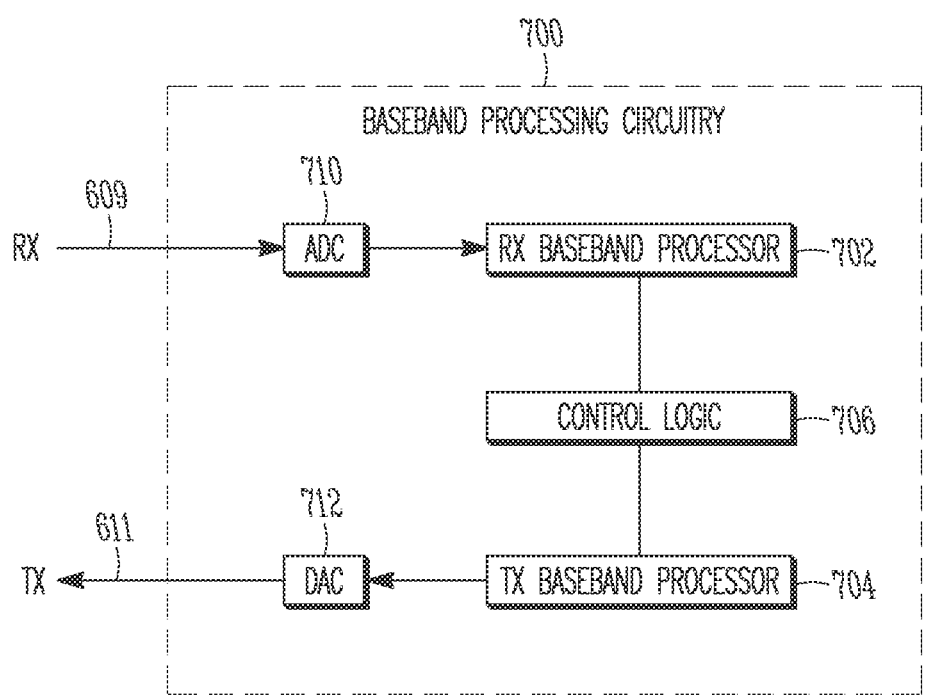
FIG. 7 illustrates a baseband processing circuitry for use in the radio architecture of FIG. 4 in accordance with some embodiments.

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4) and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals received from the radio IC circuitry 406 to digital baseband signals for processing by the RX BBP 702. In these embodiments, the baseband processing circuitry 700 may also include DAC 712 to convert digital baseband signals from the TX BBP 704 to analog baseband signals.

In some embodiments that communicate OFDM signals or OFDMA signals, such as through baseband processor 408A, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In accordance with some embodiments, the AP 102 may contend for a transmission opportunity (TXOP) to obtain access to a channel. The AP 102 may transmit a trigger frame (TF) to initiate a multi-user (MU) location measurement during the TXOP. The AP 102 may receive service requests for the MU location measurement from a plurality of STAs 103. The service requests may be multiplexed in an orthogonal frequency division multiple access (OFDMA) signal. The AP 102 may transmit an MU acknowledgement (ACK) frame that indicates reception of the service requests. The AP 102 may receive, from the STAs 103, uplink sounding frames that include per-STA timing information for the service requests and the MU ACK frame. The uplink sounding frames may be multiplexed in an OFDMA signal. The STA 103 may determine location measurements for the STAs 103 based on the per-STA timing information included in the uplink sounding frames. These embodiments will be described in more detail below.

Figure 8:
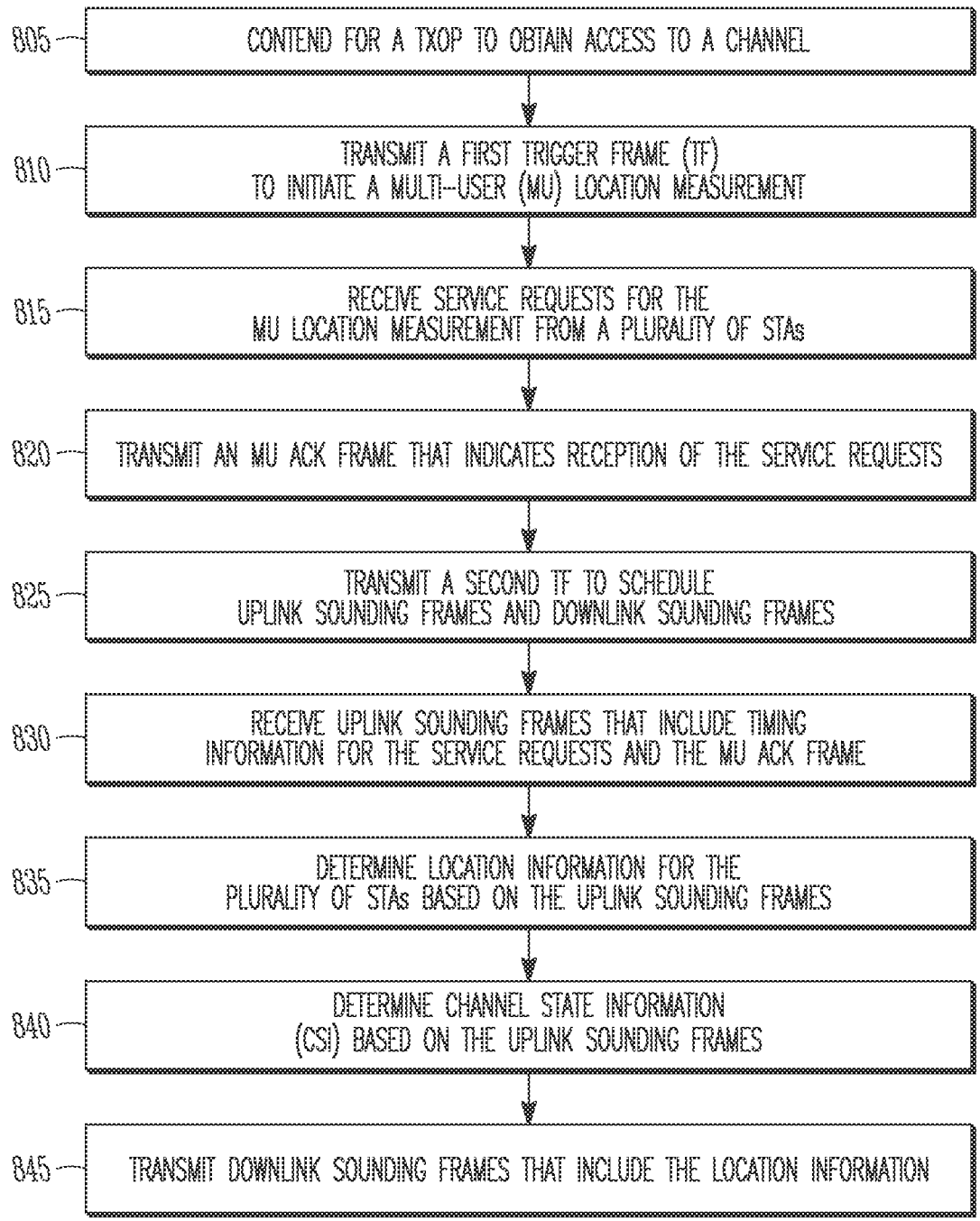
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7 and 9-15, although it is understood that the method 800 may be practiced with any other suitable systems, interfaces and components.

In some embodiments, the AP 102 and/or STA 103 may be configurable to operate as an HE device 104. Although reference may be made to an AP 102 and/or STA 103 herein, including as part of the descriptions of the method 800 and/or other methods described herein, it is understood that an HE device 104, an AP 102 configurable to operate as an HE device 104 and/or STA 103 configurable to operate as an HE device 104 may be used in some embodiments. In addition, the method 800 and other methods described herein may be applicable to STAs 103, HE devices 104 and/or APs 102 operating in accordance with one or more standards and/or protocols, such as 802.11, Wi-Fi, wireless local area network (WLAN) and/or other, but embodiments of those methods are not limited to just those devices. In some embodiments, the method 800 and other methods described herein may be practiced by other mobile devices, such as an Evolved Node-B (eNB) or User Equipment (UE). The method 800 and other methods described herein may also be practiced by wireless devices configured to operate in other suitable types of wireless communication systems, including systems configured to operate according to various Third Generation Partnership Project (3GPP) Long Term Evolution (LTE) standards. The method 800 may also be applicable to an apparatus for an STA 103, HE device 104 and/or AP 102 or other device described above, in some embodiments.

It should also be noted that embodiments are not limited by references herein (such as in descriptions of the methods 800, 1100, 1200, 1500 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

In addition, although the method 800 may be described in terms of operations performed by an AP 102, such descriptions are not limiting. The method 800 may be practiced by an STA 103 and/or other device, in some embodiments.

At operation 805 of the method 800, the AP 102 may contend for a transmission opportunity (TXOP) to obtain access to a channel. In some embodiments, the AP 102 may contend for a TXOP during which the AP 102 is to control access to the channel. In some embodiments, the AP 102 may contend for a wireless medium during a contention period to receive exclusive control of the medium during a period, including but not limited to a TXOP and/or HE control period. The AP 102 may transmit, receive and/or schedule one or more frames and/or signals during the period. The AP 102 may transmit and/or receive one or more frames and/or signals during the period. However, it should be noted that embodiments are not limited to scheduled transmission/reception or to transmission/reception in accordance with the exclusive control of the medium. Accordingly, an MPDU, PPDU, BA frame and/or other frame may be transmitted/received in contention-based scenarios and/or other scenarios, in some embodiments. Any suitable contention methods, operations and/or techniques may be used, which may or may not be part of a standard. In a non-limiting example, one or more contention methods, operations and/or techniques of an 802.11 standard/protocol and/or W-LAN standard/protocol may be used.

At operation 810, the AP 102 may transmit a trigger frame (TF). In some embodiments, the TF may be transmitted during the TXOP. In some embodiments, the TF may be transmitted to initiate a multi-user (MU) location measurement during the TXOP. In some embodiments, the MU location measurement may be configurable for location measurement of one or more associated STAs 103. In some embodiments, the MU location measurement may be configurable for location measurement of one or more unassociated STAs 103. In some embodiments, the MU location measurement may be configurable for location measurement of a combination of associated STA(s) 103 and unassociated STA(s) 103. As part of the MU location measurement, one or more location measurements for one or more STAs 103 may be determined. Such location measurements may be based on distances between the AP 102 and the STAs 103, angles of arrival between the AP 102 and the STAs 103, time-of-flight (ToF) between the AP 102 and the STAs 103 and/or other.

In a non-limiting example, the TF may be a Trigger Frame Random Access Service Request (TFR SR), which may be a type of TF. In some embodiments, the TF may be a Random Access general TF, which may ask for any Service Random Access TF or dedicated TF for location service. In some embodiments, the TF may be a non-Random Access TF that requests STAs 103 to transmit service requests if the STAs 103 wish to and/or need to. In some embodiments, the TF may include a TF type parameter (or similar) that may indicate which type of TF is used. For instance, a group of candidate TF types may include one or more of TFR SR, TF Location (TFL) and/or other. It should be noted that embodiments are not limited to usage of TFs that are of different types. For instance, the TF may not necessarily be characterized by a TF type, in some embodiments.

In some embodiments, the TF may indicate information to be used by the STA 103 to exchange one or more frames and/or signals (such as the PPDUs) with the AP 102 during a transmission opportunity (TXOP). Example information of the TF may include, but is not limited to, time resources to be used for transmission and/or reception, channel resources (such as resource units (RUs) and/or other) to be used for transmission and/or reception, identifiers of STAs 103 that are to transmit, identifiers of STAs 103 that are to receive and/or other information. It should be noted that embodiments are not limited to usage of the TF, and some embodiments may not necessarily include the usage of the TF.

In a non-limiting example, the TF and/or TFR SR may indicate a specific allocation of RUs of the channel to be used by one or more of the STAs 103 for transmission of service requests as part of an OFDMA signal and/or Random Access allocation of RUs. In another non-limiting example, the TF and/or TFR SR may indicate information related to uplink transmission by associated STAs 103 or unassociated STAs 103 or a combination thereof. For instance, the TF and/or TFR SR may be configurable to allocate at least a first RU to a particular associated STA 103 for a service request from the particular associated STA 103, and the TFR SR may be further configurable to allocate at least a second RU for contention based transmission of service requests by unassociated STAs 103. It should be noted that multiple STAs may be supported. For instance, the TF and/or TFR SR may allocate one or more RUs to each of multiple STAs for transmission of service request(s), in some cases.

At operation 815, the AP 102 may receive service requests for the MU location measurement from one or more STAs 103. In some embodiments, the service requests may be received during the TXOP, although the scope of embodiments is not limited in this respect. In some embodiments, the STAs 103 from which the service requests are received may be indicated by the TF of operation 810. One or more of the STAs 103 may be unassociated STAs 103, in some cases. The one or more STAs 103 may include one or more associated STAs 103, one or more unassociated STAs or a combination thereof.

In some embodiments, the AP 102 may receive the service requests for the MU location measurement from a plurality of STAs 103. The service requests may be multiplexed in an OFDMA signal, in some cases. In some embodiments, uplink multi-user multiple-input multiple-output (MU-MIMO) techniques and/or combination may be used for transmission of the service requests by the STAs 103.

At operation 820, the AP 102 may transmit an MU ACK frame and/or broadcast multi STAs ACK that indicates reception of the service request(s). In some embodiments, the MU ACK frame may be transmitted during the TXOP, although the scope of embodiments is not limited in this respect. The MU ACK frame may be transmitted as part of an OFDMA signal, OFDM signal and/or any suitable type of signal. In some embodiments, the MU ACK frame may include broadcast multi-STA ACK option.

At operation 825, the AP 102 may transmit a TF to schedule uplink sounding frame(s) from one or more STAs 103 and/or downlink sounding frame(s) from one or more STAs 103. In some embodiments, the TF transmitted at operation 825 may be transmitted during the TXOP, although the scope of embodiments is not limited in this respect. In a non-limiting example, the TF transmitted at operation 810 may be a first TF and the TF transmitted at operation 825 may be a second TF that is transmitted after the first TF. In some cases, the second TF may be transmitted after transmission of the MU ACK frame, although the scope of embodiments is not limited in this respect. In some embodiments, the second TF may be a TF Location (TFL). For instance, a TF type parameter included in the second TF may indicate that the second TF is a TFL. It should be noted that embodiments are not limited to usage of a TF type for either the first TF or the second TF.

At operation 830, the AP 102 may receive one or more uplink sounding frames from one or more STAs 103. In some embodiments, the uplink sounding frames may be received during the TXOP, although the scope of embodiments is not limited in this respect. In some embodiments, the uplink sounding frames may be multiplexed in an OFDMA signal, although the scope of embodiments is not limited in this respect. For instance, MU-MIMO techniques may be used by the STAs 103 for transmission of the uplink sounding frames, in some cases.

In a non-limiting example, the uplink sounding frames may include per-STA timing information for the service requests and the MU ACK frame. For instance, the sounding frame from a particular STA 103 may include timing information that is based at least partly on a transmission time of the service request from the particular STA 103 and/or a reception time of the MU ACK frame at the particular STA 103. As an example, the transmission time of the service request from the particular STA 103 and/or the reception time of the MU ACK frame at the particular STA 103 may be included in the uplink sounding frame from the particular STA 103. As another example, a difference between the reception time of the MU ACK frame at the particular STA 103 and the transmission time of the service request from the particular STA 103 may be included in the uplink sounding frame from the particular STA 103. These examples are not limiting, however, as other timing information may be included in the uplink sounding frame from the particular STA 103. Any suitable unit (such as microseconds, milliseconds, and/or other) may be used for the transmission time, reception time and/or difference between times. In some embodiments, a suitable reference time (such as a system reference time, a reference time of the STA 103, a reference time of the AP 102 and/or other) may be used to indicate the transmission time, reception time and/or difference between times.

In some embodiments, uplink sounding frames may include uplink location measurement reports (LMRs) that may include the per-STA timing information. Embodiments are not limited to usage of LMRs, however, as other elements within the uplink sounding frames may be include the per-STA timing information, in some cases. In addition, such per-STA timing information may be included directly in the uplink sounding frames in some cases.

In some embodiments, sounding waveforms may be included in the uplink sounding frames. The uplink sounding waveforms may include training symbols, in some cases. Accordingly, channel state information (CSI) may be determined at the AP 102 (such as at operation 840) based on the uplink sounding waveform(s), in some embodiments. The CSI may be determined per-STA, in some embodiments. For instance, the AP 102 may determine uplink CSI for a particular STA 103 based on an uplink sounding waveform included in an uplink sounding frame from the particular STA 103. This determination may be extended to multiple STAs 103, in some cases.

In some embodiments, the AP 102 may perform power control for the uplink sounding frames for one or more of the STAs 103 from which the sounding frame(s) are received. In a non-limiting example, a transmit power to be used by a particular STA 103 for transmission of an uplink sounding waveform may be determined based at least partly on a previously received uplink frame from the particular STA 103. Accordingly, the AP 102 may determine such a transmit power for each of multiple STAs 103, in some cases. In some embodiments, closed loop power control may be used, although the scope of embodiments is not limited in this respect. In some embodiments, the AP 102 may communicate transmit power(s) to one or more STA 103 in any suitable frame and/or message.

At operation 835, the AP 102 may determine location information for the plurality of STAs 103. In some embodiments, the location information may be determined based at least partly on information included in the uplink sounding frame. For instance, per-STA timing information may be used to determine location information for the STAs 103. Accordingly, location information of multiple STAs 103 may be determined, in some cases.

In some embodiments, a location measurement for a particular STA 103 may be based at least partly on one or more values, such as a transmission time of the service request from the particular STA 103, a reception time (at the AP 102) of the service request from the particular STA 103, a transmission time (at the AP 102) of the MU ACK frame, a reception time of the MU ACK frame at the particular STA 103 and/or other time. In some cases, one or more differences, summations and/or other combinations of such values may be used.

In a non-limiting example, a time-of-flight (ToF) measurement may be determined. The ToF measurement may be based on a first difference between the reception time of the MU ACK frame at the particular STA 103 and the transmission time of the service request from the particular STA 103. The ToF measurement may be further based on a second difference between the transmission time (at the AP 102) of the MU ACK frame and the reception time (at the AP 102) of the service request from the particular STA 103. The ToF measurement may be determined as one half of a difference between the first difference and the second difference. In addition, a range estimate of the particular STA 103 may be determined using the ToF measurement and the speed of light. For instance, the range estimate may be (or may be based on) the ToF measurement multiplied by the speed of light.

At operation 845, the AP 102 may transmit one or more downlink sounding frames. In some embodiments, the downlink sounding frames may be transmitted during the TXOP, although the scope of embodiments is not limited in this respect. The downlink sounding frames may be multiplexed in a third OFDMA signal, in some cases. In some embodiments, the downlink sounding frames may include the determined location measurements for the STAs 103 and/or the per-STA CSI. Downlink LMRs may be used, in some cases, although the scope of embodiments is not limited in this respect. In some embodiments, the downlink sounding frames may further include downlink sounding waveforms, which may be used by the STAs 103 for determination of CSI in the downlink direction.

In some embodiments, the AP 102 may determine modulation and coding schemes (MCSs) to be used by the STAs 103. The MCSs may be determined based at least partly on the timing information described previously, the determined location measurement(s) and/or other information. For instance, for the STAs 103 from which the service requests are received (or at least a portion of those STAs 103), an MCS may be determined for each STA 103. The MCSs may be communicated to the STAs 103 using any suitable message.

Figure 9:
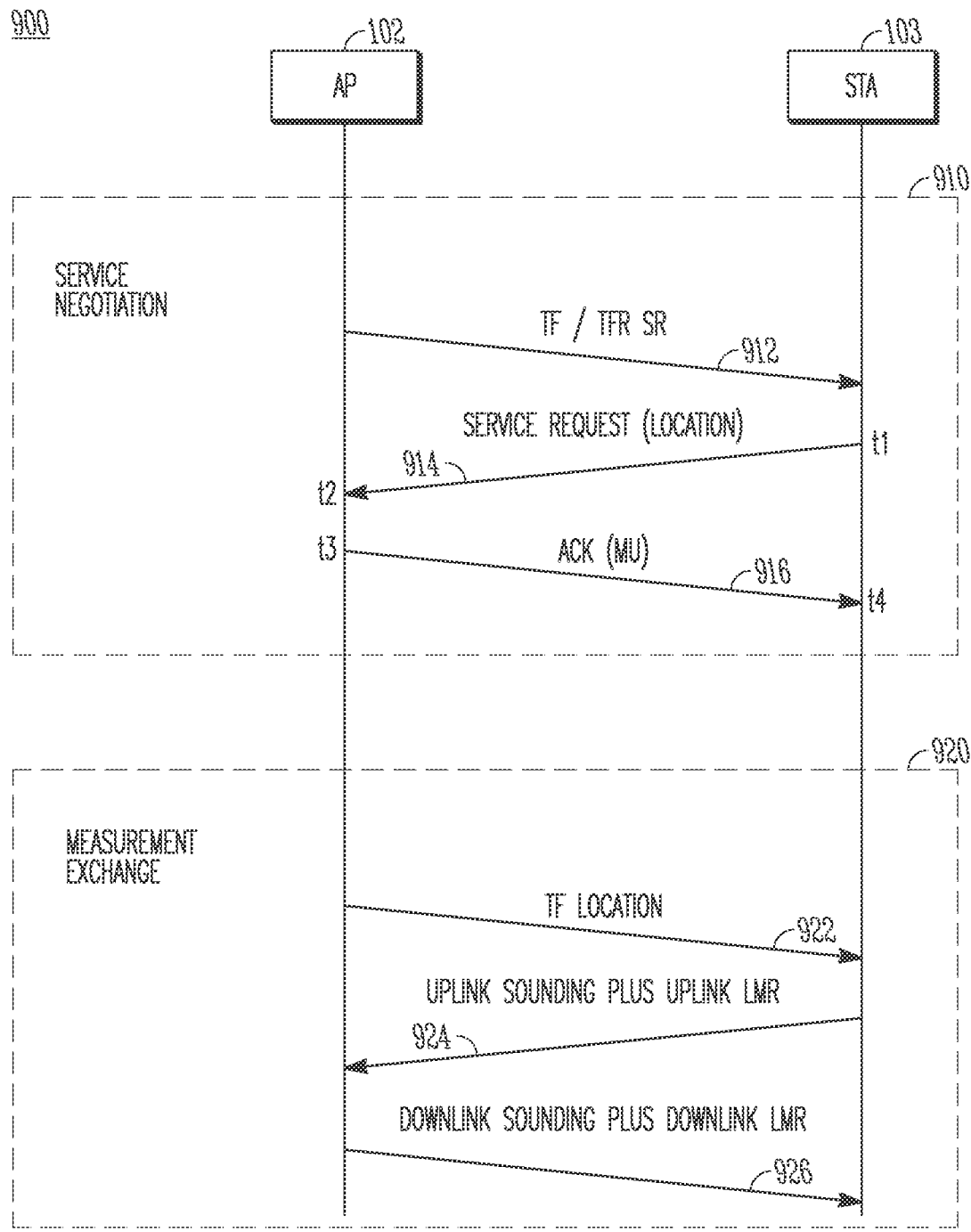
FIG. 9 illustrates example operations in accordance with some embodiments.
Figure 10:
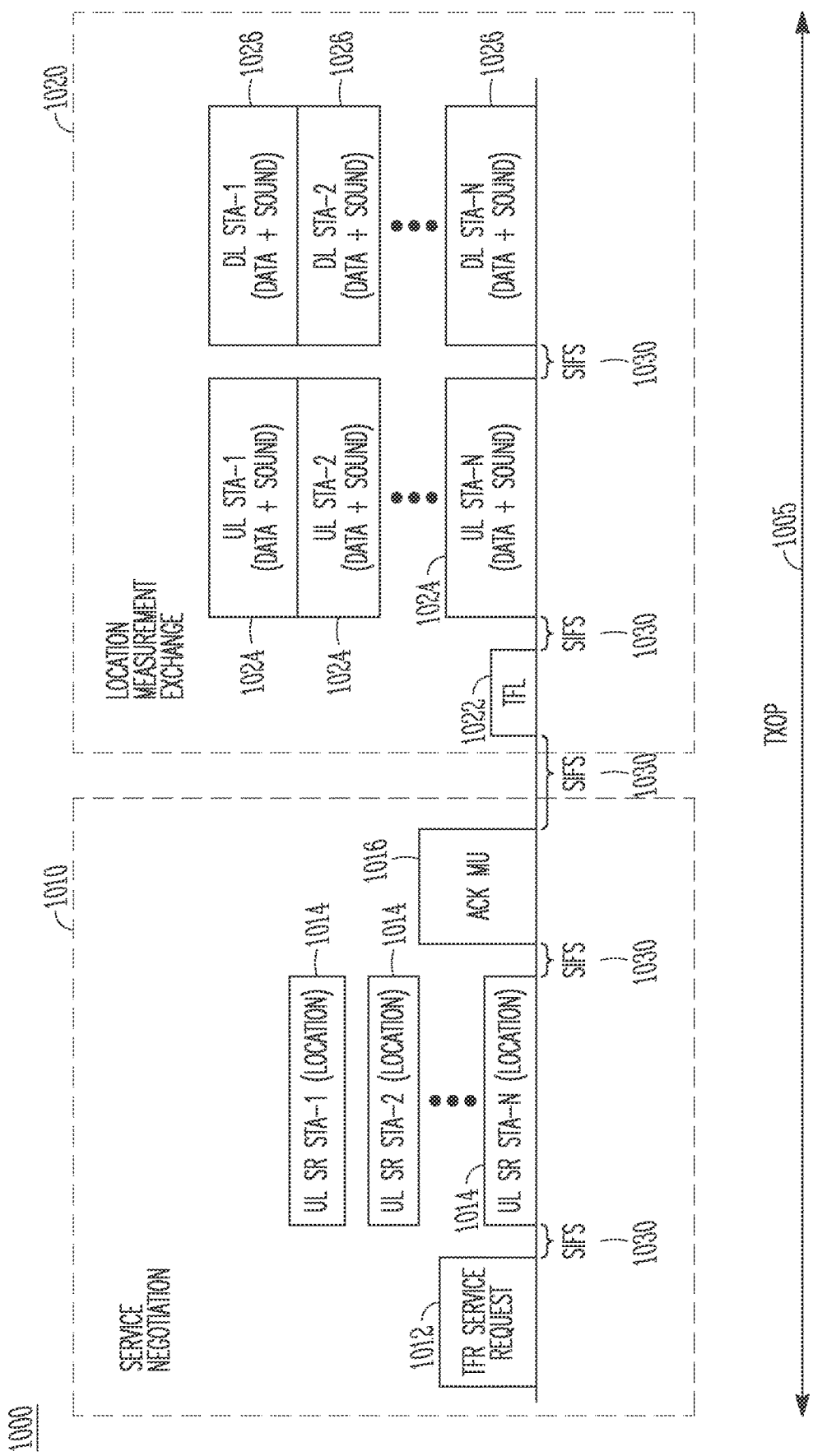
FIG. 10 illustrates example frames in accordance with some embodiments.

FIG. 9 illustrates example operations in accordance with some embodiments. FIG. 10 illustrates example frames in accordance with some embodiments. It should be noted that the examples shown in FIGS. 9-10 may illustrate some or all of the concepts and techniques described herein in some cases, but embodiments are not limited by the examples of FIGS. 9-10. For instance, embodiments are not limited by the name, number, type, size, ordering, arrangement and/or other aspects of the frames, signals, fields, data blocks, operations, time resources and other elements as shown in FIGS. 9-10. Although some of the elements shown in the examples of FIGS. 9-10 may be included in an 802.11 standard and/or other standard, embodiments are not limited to usage of such elements that are included in standards.

Referring to FIG. 9, at operation 912, the AP 102 may transmit a TFR SR. At operation 914, the STA 103 may transmit a service request for location. At operation 916, the AP 102 may transmit an ACK MU frame. Operations 912-916 may be performed during a service negotiation phase 910, in some cases, although embodiments are not limited to usage of a phase. At operation 922, the AP 102 may transmit a TF location. At operation 924, the STA 103 may transmit an uplink sounding frame that may include an uplink LMR (with timing information). At operation 926, the AP 102 may transmit downlink sounding frames that may include downlink LMRs. Location information, uplink CSI and/or other information may be included. Operations 922-926 may be performed during a measurement exchange phase 920, in some cases, although embodiments are not limited to usage of a phase.

Referring to FIG. 10, example frames are shown. The AP 102 may transmit a TFR SR 1012. The STAs 103 may transmit service requests for location in an OFDMA signal. Any suitable number of STAs 103 (such as any suitable value for the variable "n") may be used. The AP 102 may transmit an ACK MU frame 1016. The frames 1012-1016 may be exchanged during a service negotiation phase 1010, in some cases, although embodiments are not limited to usage of a phase. The AP 102 may transmit a TF location 1022. The STAs 103 may transmit uplink sounding frames 1024. In some cases, the uplink sounding frames may include data (such as uplink LMRs, timing information and/or other) and may further include sounding waveforms. In some cases, OFDMA may be used for transmission of the uplink sounding frames. The AP 102 may transmit downlink sounding frames 1026. Location information, uplink CSI and/or other information may be included. In some cases, OFDMA may be used for transmission of the downlink sounding frames. The frames 1022-1026 may be exchanged during a measurement exchange phase 1020, in some cases, although embodiments are not limited to usage of a phase.

In the previous non-limiting example, the time-of-flight (ToF) measurement may be illustrated using FIG. 9. The ToF measurement may be based on a first difference (t4-t1) between the reception time (t4) of the MU ACK frame at the particular STA 103 and the transmission time (t1) of the service request from the particular STA 103. The ToF measurement may be further based on a second difference (t3-t2) between the transmission time (t3) of the MU ACK frame at the AP 102 and the reception time (t2) of the service request from the particular STA 103 at the AP 102. The ToF measurement may be determined as ($\frac{1}{2}$)*((t4-t1)-(t3-t2)).

It should be noted that in the above example, the STA 103 may provide the AP 102 with t1 and t4 (and/or the difference (t4-t1)), and the values of t2 and t3 may be known (and/or determinable) at the AP 102.

In some embodiments, a scheduled operation mode may be used. In a non-limiting example, a simultaneous multi-user transmission and reception mode may be used, in which an AP 102 may control resource allocation assignment. For instance, the assigned client STA 103, bandwidth, modulation and coding scheme (MCS), transmission time and/or other parameters may be allocated and/or specified by the AP 102. Such a mode may be included in an 802.11 standard and/or other standard, although embodiments are not limited to usage of modes included in a standard.

In some embodiments, a scheduled location (and/or position) measurement and signaling techniques may be used. In some of those embodiments, the techniques may be applicable to associated and unassociated MU operation. In some embodiments, trigger based location (and/or position) measurement and signaling may be used. In some cases, multiple phases may be used, although the scope of embodiments is not limited to usage of different phases. For instance, a service negotiation phase and a location measurement exchange phase may be used.

In some embodiments, concurrent fine timing measurements (FTM) from multiple STAs (associated and unassociated) may be performed via enabling multiple concurrent negotiation and measurements to take place in a single TXOP. In some embodiments, scheduled location (and/or position) measurements may be supported. For instance, an 802.11ax MU mode may be used. When the 802.11ax MU mode is used, an STA 103 in the unassociated or legacy mode may have a much lower probability of obtaining the medium. For instance, venues in which an indoor location is used (such as malls, stadia, large event sites and/or other) may use the 802.11ax MU mode, in some cases.

In some embodiments, reciprocal (and/or symmetrical) measurement may be enabled by techniques described herein. A full band preamble for UL and DL may be used (for instance, unlike other techniques in which DL measurements may be limited to legacy non-HT duplicate frames). In some cases, higher accuracy may be enabled, due to improved channel resolution (such as a "DL sounding plus LMR" part shown in various FIGS. herein).

In some embodiments, techniques described herein may enable both measurement and measurement results to be conveyed using a single frame (such as the "data plus sounding" transmission/reception shown in various FIGS. herein). In some cases, this may result in an efficient use of the medium (channel) and power.

In some embodiments, techniques described herein may enable an AP 102 and/or STA 103 to provide location measurement results in a same "DL Sounding plus LMR" part at least partly due to the "UL Sounding plus LMR" part preceding the "DL Sounding plus LMR" part (such as in a "location measurement exchange phase" shown in various FIGS. herein).

In some embodiments, channel state information (CSI) may be provided to a client (such as a client STA 103 or AP 102). Accordingly, the client may be enabled to make location measurements (such as "Time Of Arrival" and/or other) for both directions. Thus, lower computational load at the AP 102 may be enabled.

In some embodiments, techniques described herein may enable a more efficient use of the medium in comparison to other techniques (such as REV mc FTM and/or other) by enabling division of the BW to distribute multiple client STAs 103 over the frequency domain. For instance, a first STA 103 may use an upper 40 Mhz and a second STA 103 may use a lower 40 MHz part.

In some embodiments, measurements may include one or more of range, distance, angle (azimuth and/or elevation) and/or other measurement. For instance, signaling in the Service Request may be used. In some cases, a same measurement frame may be used.

Referring to FIGS. 9-10, during the negotiation phase, the STA(s) 103 may randomly select an RU from a Trigger frame for random access or a scheduled RU in the Trigger frame. The STAs 103 may either send an SR for location measurement or any other short (control or data) frames (including but not limited to frames defined in 802.11ax).

In FIG. 10, the STAs 103 send SRs as solicited by a Trigger frame for random access. The timing starts with a TFR SR (Trigger Frame Random Access Service Request), which is used to enable assignment of UL resources to client STAs 103 to allow, permit and/or enable both associated and unassociated STAs 103 to make location/positioning measurement requests. This may be done using a collision channel in one of several methods. For instance, the use of this collision allocation may be extended to unassociated operation, in some cases. The TFR may allocate a time/frequency segment to make an SR of type Location and may define an MCS (such as an MCS requirement, recommended MCS and/or MCS to be used) of each segment. STAs 103 may choose one of the segments randomly to make an SR of type Location and may provide their identity. The ACK (MU) may indicate which attempts were successfully received by the AP 102. The second phase is the Location Measurement Exchange phase. This phase may be composed of two parts (such as an "UL sounding plus LMR" part and a "DL sounding plus LMR" part in this example), although embodiments are not limited to two parts or even to usage of parts. The "UL sounding plus LMR" part may precede the "DL sounding plus LMR" part, in some cases, such that the measurement results of the former part (UL) are available for reporting during the latter part (DL). In the "UL sounding plus LMR" part, the Trigger Frame (TF) may be a TF Location (TFL), which may allocate resources and may time synchronize the MU for UL transmission. In the "DL sounding plus LMR" part, the AP 102 may respond with one or more DL measurement frames (Sounding plus LMR) to the client STAs 103. In some embodiments, the response may also include the measured channel state information (CSI) based on the UL measurement.

Figure 11:
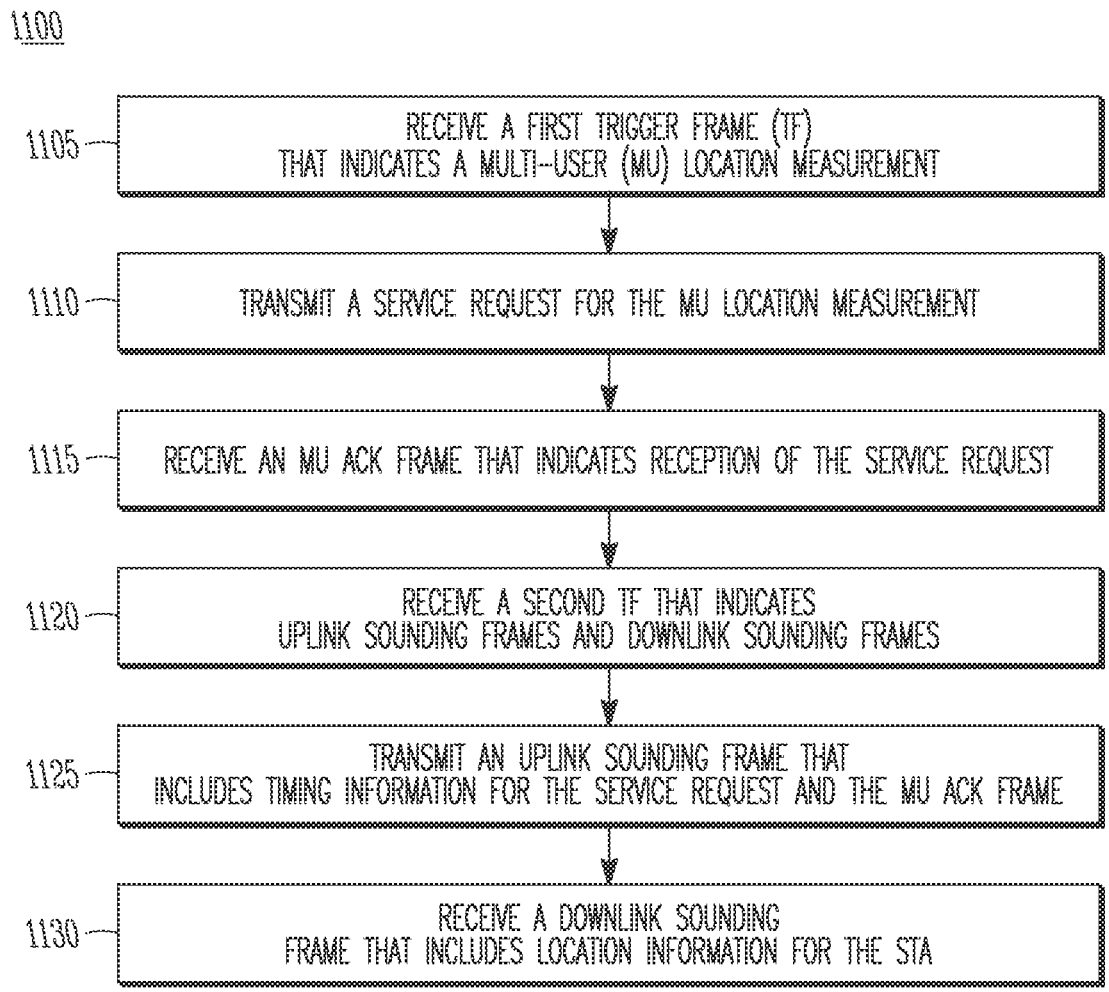
FIG. 11 illustrates the operation of another method of communication in accordance with some embodiments.

FIG. 11 illustrates the operation of another method of communication in accordance with some embodiments. As mentioned previously regarding the method 800, embodiments of the method 1100 may include additional or even fewer operations or processes in comparison to what is illustrated in FIG. 11 and embodiments of the method 1100 are not necessarily limited to the chronological order that is shown in FIG. 11. In describing the method 1100, reference may be made to FIGS. 1-10 and 12-15, although it is understood that the method 1100 may be practiced with any other suitable systems, interfaces and components.

In some embodiments, the STA 103 may be configurable to operate as an HE device 104. Although reference may be made to an STA 103 herein, including as part of the descriptions of the method 1100 and/or other methods described herein, it is understood that an HE device 104 and/or STA 103 configurable to operate as an HE device 104 may be used in some embodiments. In addition, embodiments of the method 800 may be applicable to APs 102, STAs 103, UEs, eNBs or other wireless or mobile devices. The method 1100 may also be applicable to an apparatus for an AP 102, STA 103 and/or other device described above.

It should be noted that the method 800 may be practiced by an AP 102 and may include exchanging of elements, such as frames, signals, messages, fields and/or other elements, with an STA 103. Similarly, the method 1100 may be practiced at an STA 103 and may include exchanging of such elements with an AP 102. In some cases, operations and techniques described as part of the method 800 may be relevant to the method 1100. In addition, embodiments of the method 1100 may include operations performed at the STA 103 that are reciprocal to or similar to other operations described herein performed at the AP 102. For instance, an operation of the method 1100 may include reception of a frame from the AP 102 by the STA 103 while an operation of the method 800 may include transmission of the same frame or similar frame by the AP 102.

In addition, previous discussion of various techniques and concepts may be applicable to the method 1100 in some cases, including contention based access, TXOPs, trigger frames (TFs), TFR SR, TFL, MU location measurement, location measurements, service request, MU ACK frame, uplink sounding frames, uplink sounding waveforms, uplink LMRs, downlink sounding frames, downlink sounding waveforms, downlink LMRs, CSI, ToF measurements and/or others. In addition, one or more of the examples shown in FIGS. 9-10 may also be applicable, in some cases, although the scope of embodiments is not limited in this respect.

At operation 1105, the STA 103 may receive a trigger frame (TF) received during a transmission opportunity (TXOP) obtained by an AP 102. At operation 1110, the STA 103 may transmit, in response to the TF, a service request for a location measurement of the STA 103 as part of a multi-user (MU) location measurement by the AP 102. In some embodiments, the service request may be multiplexed in an OFDMA signal. One or more RUs indicated by the TF received at operation 1105 may be used by the STA 103 for the service request. At operation 1115, the STA 103 may receive an MU ACK frame that indicates reception of the service request. At operation 1120, the STA 103 may receive a TF that indicates (and/or schedules) uplink sounding frame(s) and downlink sounding frame(s). At operation 1125, the STA 103 may transmit an uplink sounding frame that includes timing information based at least partly on a transmission time of the service request and a reception time of the MU ACK frame. In some embodiments, the uplink sounding frame may be multiplexed in an OFDMA signal. One or more RUs indicated by the TF received at operation 1120 may be used by the STA 103 for the uplink sounding frame. At operation 1130, the STA 103 may receive a downlink sounding frame that includes the location measurement for the STA 103. The location measurement may be based on the timing information included in the uplink sounding frame. In some embodiments, the downlink sounding frame may be multiplexed in an OFDMA signal. In some embodiments, some or all of operations 1105-1130 may be performed during the TXOP.

Figure 12:
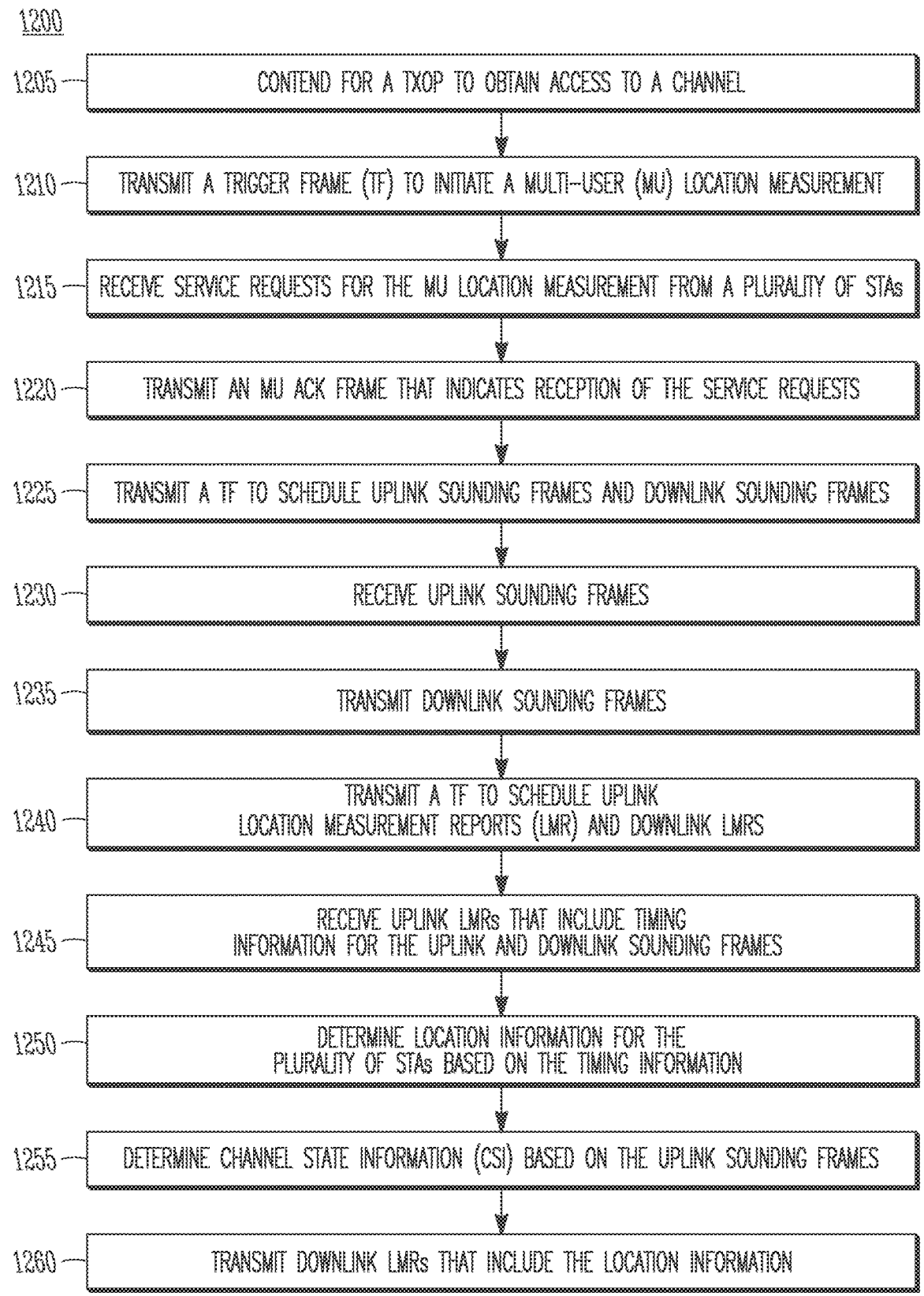
FIG. 12 illustrates the operation of another method of communication in accordance with some embodiments.
Figure 13:
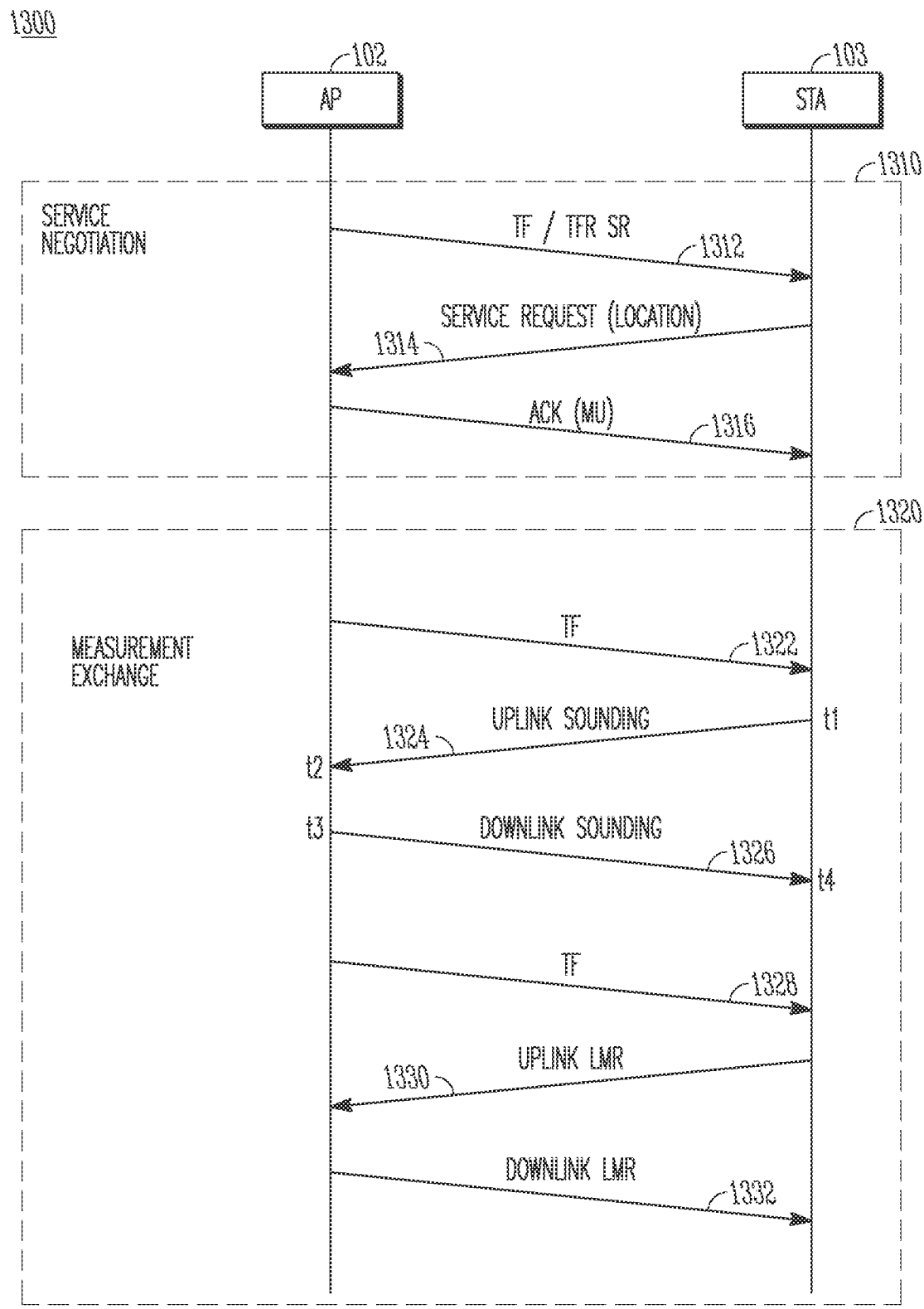
FIG. 13 illustrates additional example operations in accordance with some embodiments.
Figure 14:
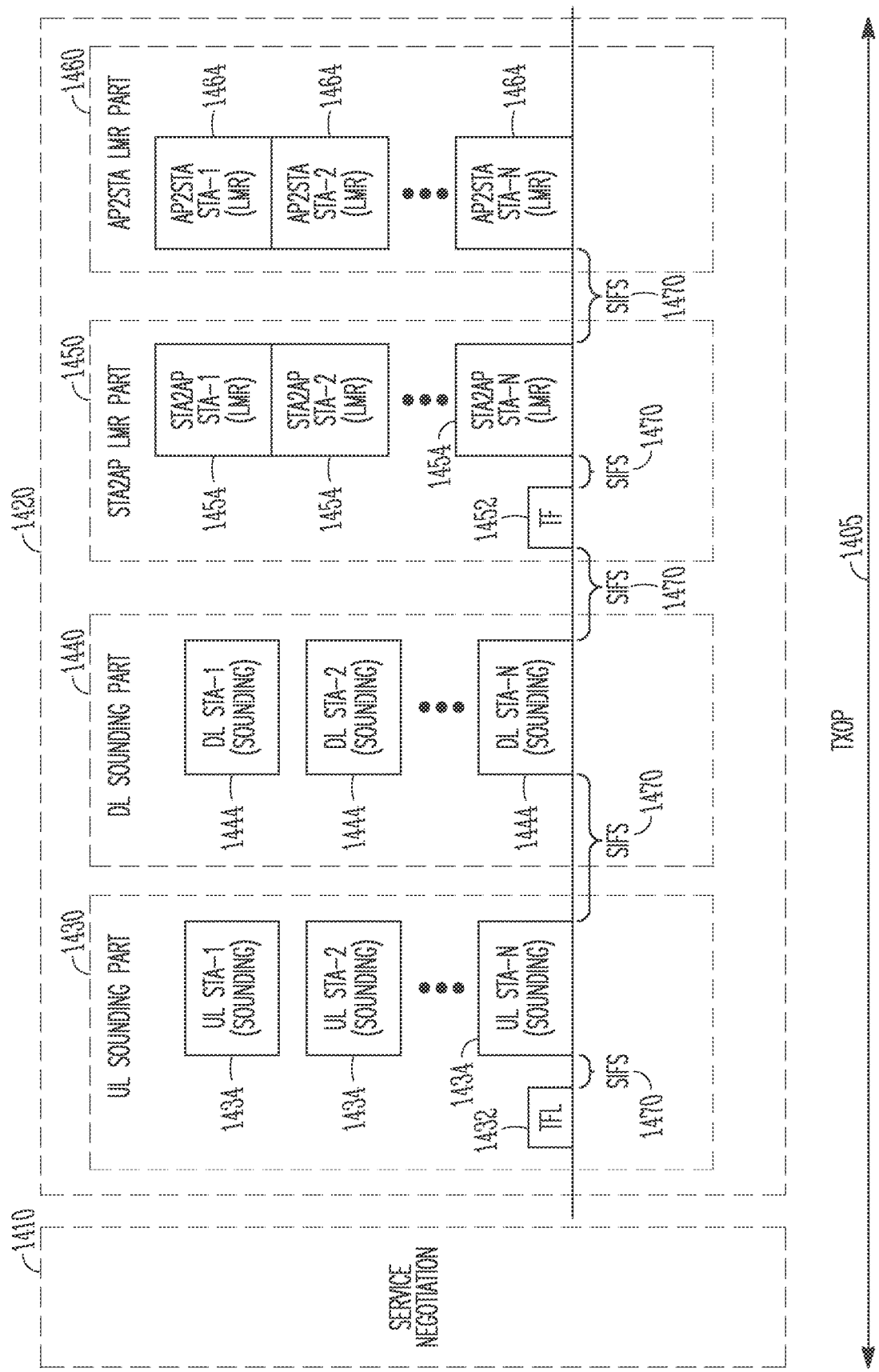
FIG. 14 illustrates additional example frames in accordance with some embodiments.
Figure 15:
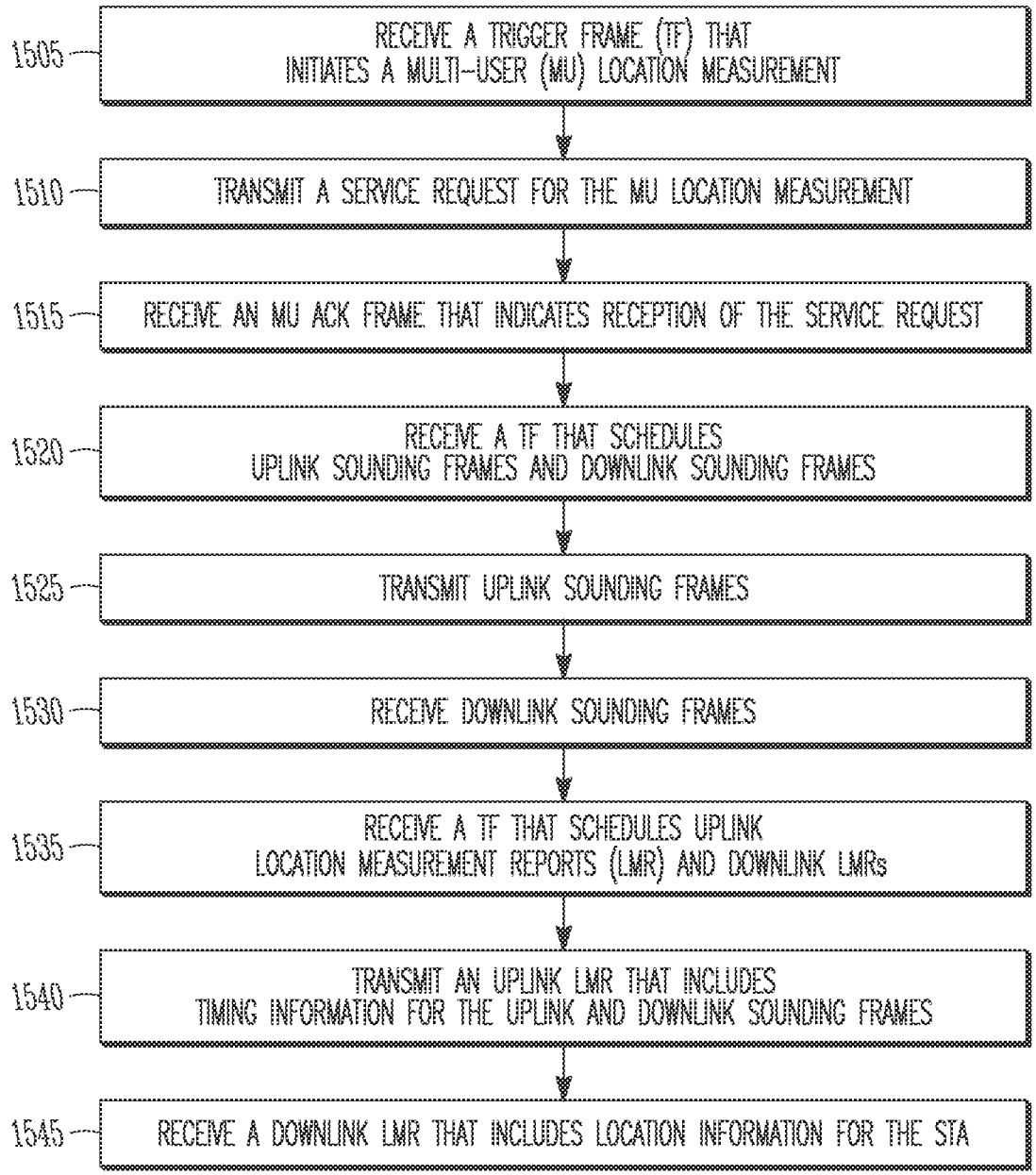
FIG. 15 illustrates the operation of another method of communication in accordance with some embodiments.

FIG. 12 illustrates the operation of another method of communication in accordance with some embodiments. FIG. 13 illustrates additional example operations in accordance with some embodiments. FIG. 14 illustrates additional example frames in accordance with some embodiments. FIG. 15 illustrates the operation of another method of communication in accordance with some embodiments. As mentioned previously regarding the method 800, embodiments of the methods 1200 and/or 1500 may include additional or even fewer operations or processes in comparison to what is illustrated in FIGS. 12 and/or 15 and embodiments of the method 1200 and/or 1500 are not necessarily limited to the chronological order that is shown in FIGS. 12 and/or 15. In describing the method 1100, reference may be made to any of FIGS. 1-15, although it is understood that the methods 1200 and/or 1500 may be practiced with any other suitable systems, interfaces and components. Embodiments of the methods 1200 and/or 1500 may be applicable to APs 102, STAs 103, UEs, eNBs or other wireless or mobile devices. The methods 1200 and/or 1500 may also be applicable to an apparatus for an AP 102, STA 103 and/or other device described above. It should be noted that the method 1200 may be practiced by an AP 102 and may include exchanging of elements, such as frames, signals, messages, fields and/or other elements, with an STA 103. Similarly, the method 1500 may be practiced at an STA 103 and may include exchanging of such elements with an AP 102. In some cases, operations and techniques described as part of the method 1200 may be relevant to the method 1500. In addition, embodiments of the method 1500 may include operations performed at the STA 103 that are reciprocal to or similar to other operations described herein performed at the AP 102. For instance, an operation of the method 1500 may include reception of a frame from the AP 102 by the STA 103 while an operation of the method 1200 may include transmission of the same frame or similar frame by the AP 102. In addition, previous discussion of various techniques and concepts may be applicable to the methods 1200 and/or 1500 in some cases, including contention based access, TXOPs, trigger frames (TFs), TFR SR, TFL, MU location measurement, location measurements, service request, MU ACK frame, uplink sounding frames, uplink sounding waveforms, uplink LMRs, downlink sounding frames, downlink sounding waveforms, downlink LMRs, CSI, ToF measurements and/or others. One or more operations of the methods 1200 and/or 1500 may be similar to, related to, reciprocal to and/or otherwise related to one or more operations of the methods 800 and/or 1100, although the scope of embodiments is not limited in this respect. In addition, one or more of the examples shown in FIGS. 13-14 may also be applicable, in some cases, although the scope of embodiments is not limited in this respect.

It should be noted that the examples shown in FIGS. 13-14 may illustrate some or all of the concepts and techniques described herein in some cases, but embodiments are not limited by the examples of FIGS. 13-14. For instance, embodiments are not limited by the name, number, type, size, ordering, arrangement and/or other aspects of the frames, signals, fields, data blocks, operations, time resources and other elements as shown in FIGS. 13-14. Although some of the elements shown in the examples of FIGS. 13-14 may be included in an 802.11 standard and/or other standard, embodiments are not limited to usage of such elements that are included in standards.

At operation 1205, the AP 102 may contend for a transmission opportunity (TXOP) to obtain access to a channel. At operation 1210, the AP 102 may transmit a trigger frame (TF) to indicate that a plurality of STAs 103 are to transmit uplink sounding frames during the TXOP. In some embodiments, the TF transmitted at operation 1210 may be a Trigger Frame Random Access Service Request (TFR SR). In some cases, a TF type parameter included in the TF transmitted at operation 1210 may indicate a TF type from a group of candidate TF types that includes one or more of a TFR SR, TFL and/or other TF type.

At operation 1215, the AP 102 may receive service requests from one or more STAs 103. In some embodiments, the service requests may be received in an OFDMA signal. In some embodiments, the service requests may be received in response to the TF of operation 1205. At operation 1220, the AP 102 may transmit an MU ACK frame that indicates reception of the service requests.

At operation 1225, the AP 102 may transmit a TF to schedule uplink sounding frame(s) and/or downlink sounding frame(s). At operation 1230, the AP 102 may receive uplink sounding frames multiplexed in an OFDMA signal received during the TXOP. In some embodiments, the uplink sounding frame(s) may comprise training symbols for uplink channel state information (CSI) estimation. At operation 1235, the AP 102 may transmit, during the TXOP, downlink sounding frame(s) multiplexed in an OFDMA signal. In some embodiments, the downlink sounding frame(s) may comprise training symbols for downlink CSI estimation.

At operation 1240, the AP 102 may transmit a TF to schedule uplink LMR(s) and/or downlink LMR(s). In some embodiments, the TF transmitted at operation 1240 may be a Trigger Frame for Location (TFL). In some cases, a TF type parameter included in the TF transmitted at operation 1240 may indicate a TF type from a group of candidate TF types that includes one or more of a TFR SR, TFL and/or other TF type. At operation 1245, the AP 102 may receive uplink LMRs multiplexed in an OFDMA signal received during the TXOP. In some embodiments, the uplink LMRs may include per-STA timing information for the uplink sounding frames and the downlink sounding frames. In a non-limiting example, the per-STA timing information of a particular STA 103 of the plurality may be based on one or more of: a transmission time of the uplink sounding frame from the particular STA 103; a reception time of the downlink sounding frame for the particular STA 103 at the particular STA 103; a difference between the transmission time of the uplink sounding frame from the particular STA 103 and the reception time of the downlink sounding frame for the particular STA 103 at the particular STA 103; and/or other information. It should be noted that the transmission of the uplink LMRs by one or more STAs 103 may be optional, in some embodiments. Accordingly, in some embodiments, the AP 102 may not necessarily receive the uplink LMRs.

At operation 1250, the AP 102 may determine location measurements for the STAs 103 based at least partly on the per-STA timing information included in the uplink LMRs. In some embodiments, the location measurement(s) may be or may be based on distances between the AP 102 and the STAs 103, ToF between the AP 102 and the STAs 103, angles of arrival between the AP 102 and the STAs 103 and/or other suitable measurements.

In a non-limiting example, a time-of-flight (ToF) measurement for a particular STA 103 may be determined. The ToF measurement of the particular STA 103 may be based on a first difference between the reception time of the downlink sounding frame for the particular STA 103 at the particular STA 103 and the transmission time of the uplink sounding frame from the particular STA 103. The ToF measurement of the particular STA 103 may be further based on a difference between a transmission time, at the AP 102, of the downlink sounding frame for the particular STA 103 and a reception time, at the AP 102, of the uplink sounding frame from the particular STA 103. For instance, The ToF measurement may be determined as one half of a difference between the first difference and the second difference. In addition, a range estimate of the particular STA 103 may be determined using the ToF measurement and the speed of light. For instance, the range estimate may be (or may be based on) the ToF measurement multiplied by the speed of light. It should be noted that one or more measurements such as location, timing, ToF and/or other, may be determined by the AP 102, in some embodiments. In some embodiments, the STA 103 may determine one or more such measurements. In some embodiments, the AP 102 may determine one or more such measurements and the STA 103 may determine one or more such measurements.

At operation 1255, the AP 102 may determine uplink CSI measurements. In some embodiments, uplink sounding waveforms included in the uplink sounding frames may be used for this operation. Some embodiments may not necessarily include operation 1255. At operation 1260, the AP 102 may transmit downlink LMRs multiplexed in an OFDMA signal. In some embodiments, the downlink LMRs may include the location measurements. In some embodiments, the downlink LMRs may include the uplink CSI measurements.

In some embodiments, some or all frames transmitted and/or received in operations 1210-1260 may be transmitted and/or received during the TXOP, although the scope of embodiments is not limited in this respect.

Referring to FIG. 13, at operation 1312, the AP 102 may transmit a TFR SR. At operation 1314, the STA 103 may transmit a service request for location. At operation 1316, the AP 102 may transmit an ACK MU frame. Operations 1312-1316 may be performed during a service negotiation phase 1310, in some cases, although embodiments are not limited to usage of a phase. At operation 1322, the AP 102 may transmit a TF. At operation 1324, the STA 103 may transmit an uplink sounding frame. At operation 1326, the AP 102 may transmit downlink sounding frames. At operation 1328, the AP may transmit a TF. At operation 1330, the STA may transmit uplink LMRs. The uplink LMRs may include timing information, in some cases. At operation 1332, the AP 102 may transmit downlink LMRs. Location information, uplink CSI and/or other information may be included in the downlink LMRs, in some cases. Operations 1322-1332 may be performed during a measurement exchange phase 1320, in some cases, although embodiments are not limited to usage of a phase.

Referring to FIG. 14, example frames are shown. One or more frames of a service negotiation phase 1410 may be exchanged, including but not limited to a TF, service requests, MU ACK and/or other. The AP 102 may transmit a TF 1432. The STAs 103 may transmit uplink sounding frames 1434. Any suitable number of STAs 103 (such as any suitable value for the variable "n") may be used. The AP 102 may transmit a downlink sounding waveforms 1436. The AP 102 may transmit a TF 1452. The STAs 103 may transmit uplink LMRs 1454. The AP 102 may transmit downlink LMRs 1456.

In the previous non-limiting example, the time-of-flight (ToF) measurement may be illustrated using FIG. 13. The ToF measurement may be based on a first difference (t4−t1) between the reception time (t4) of the downlink sounding frame the particular STA 103 and the transmission time (t1) of the uplink sounding frame from the particular STA 103. The ToF measurement may be further based on a second difference (t3−t2) between the transmission time (t3) of the downlink sounding frame at the AP 102 and the reception time (t2) of the uplink sounding frame from the particular STA 103 at the AP 102. The ToF measurement may be determined as (½)*((t4−t1)−(t3−t2)).

It should be noted that in the above example, the STA 103 may provide the AP 102 with t1 and t4 (and/or the difference (t4−t1)), and the values of t2 and t3 may be known (and/or determinable) at the AP 102.

In some embodiments, a trigger frame (TF) based location (and/or position) measurement and signaling may be used. Such measurement and signaling may be divided into two phases, in some cases, such as a service negotiation phase and a location measurement exchange phase (such as shown in FIGS. 13-14). Embodiments are not limited to two phases, to these particular phases or to usage of phases. Accordingly, operation(s) may be performed, in some embodiments, without those operations being part of a phase. FIGS. 13-14 describe an example message flow. The AP 102 may transmit a TF (for associated STAs 103) or a TFR (for both associated and unassociated STAs 103) allowing the STA 103 to make a Service Request of type Location followed by acknowledgment by the AP 102 indicating correct reception of the request for one or more STAs 103. The service negotiation directs the STA 103 to the time at which the measurement exchange will commence. After the service negotiation, the AP 102 may assign the resource(s) to STAs 103 to send and receive an UL and a DL measurement frame (UL and DL sounding), followed by a TF allocating resources for UL and DL Location Measurement Reporting (UL LMR and DL LMR). In some cases, the entire exchange may happen in a single TxOP (or part of a TxOP) such that the overall on-channel time may be reduced and/or minimized.

In some embodiments, techniques described herein may enable concurrent FTM measurement from multiple STAs 103 by sending a simultaneous sounding measurement frame and/or Location Measurement Report (LMR). In some embodiments, one or more operations (such as shown in FIGS. 13-14 and/or other FIGS.) may be performed in accordance with an 802.11ax MU mode. The scope of embodiments is not limited in this respect, however, as one or more operations shown in FIGS. 13-14 may be performed in a mode other than the 802.11ax MU mode. The operations may be performed without usage of a mode, in some embodiments.

FIG. 14 provides a timing of a location measurement procedure (for instance, range and/or angle measurements) under the 802.11ax MU mode. Referring to FIGS. 13-14, any suitable operations may be used in the negotiation phase. In a non-limiting example, one or more techniques included in an 802.11 standard may be used. For instance, allocation of RUs may include a pre-scheduled allocation or an allocation resulting from use of the Random Access (RA) allocation in which STAs 103 may randomly select an RU from a set described by a Trigger frame for random access or a scheduled RU in a Trigger frame. In a non-limiting example, the STA 103 may either send a Service Request (SR) for location measurement. In another non-limiting example, the STA 103 may send another type of frame and/or message. For instance, a short (control or data) frame included in an 802.11ax standard and/or other standard.

In some embodiments, the measurement exchange part may include part(s) for one or more of the following: UL sounding, DL sounding, LMR reporting from AP 102 to STA 103, LMR reporting from STA 103 to AP 102 and/or other. In some embodiments, the UL sounding part may start with a TF allocating UL timing and resources to one or more STAs 103 followed by an UL sounding followed by a DL sounding part. After the sounding part, a second TF may be transmitted allocating UL resources and timing for the LMR reporting from AP 102 to STA 103 followed by LMR reporting from STA 103 to AP 102. In some embodiments, the response may also include the measured channel state information (CSI) based on the UL measurement.

Referring to FIG. 15, at operation 1505 of the method 1500, the STA 103 may receive a TF that indicates that a plurality of STAs 103 are to transmit uplink sounding frames during a transmission opportunity (TXOP) obtained by an AP 102. At operation 1510, the STA 103 may transmit a service request for a location measurement in response to the TF received at operation 1510. The service request may be multiplexed in an OFDMA signal, in some embodiments. The STA 103 may receive an MU ACK frame that indicates reception of the service request at operation 1515.

At operation 1520, the STA 103 may receive, during the TXOP, a TF that schedules uplink sounding frames and downlink sounding frame. At operation 1525, the STA 103 may transmit, during the TXOP, an uplink sounding frame multiplexed in an OFDMA signal. The uplink sounding frame may comprise training symbols for uplink channel state information (CSI) estimation, in some embodiments. At operation 1530, the STA 103 may receive a downlink sounding frame. The downlink sounding frame may comprise training symbols for downlink CSI estimation, in some embodiments. The downlink sounding frame may be multiplexed in an OFDMA signal received during the TXOP, in some embodiments.

At operation 1535, the STA 103 may receive, during the TXOP, a TF that schedules uplink LMR(s) and downlink LMR(s). At operation 1540, the STA 103 may transmit, during the TXOP, an uplink LMR. The uplink LMR may include timing information for the transmission of the uplink sounding frame and the downlink sounding frames, in some embodiments. For instance, previously described timing information may be included. At operation 1545, the STA 103 may receive a downlink LMR during the TXOP. In some embodiments, the downlink LMR may include a location measurement for the STA 103 based at least partly on the timing information included in the uplink LMR.

It should be noted that embodiments are not limited to the operations, phases, frames, signals and/or other elements shown in the FIGS. 8-15. Some embodiments may not necessarily include all operations, phases, frames, signals and/or other elements shown. Some embodiments may include one or more additional operations, phases, frames, signals and/or other elements. One or more operations may be optional, in some embodiments. For instance, in FIG. 9, one or more of the operations indicated by 912, 914, 916, 922, 924, 926 may not necessarily be included, in some embodiments.

In Example 1, an apparatus of an access point (AP) may comprise memory. The apparatus may further comprise processing circuitry. The processing circuitry may be configured to contend for a transmission opportunity (TXOP) to obtain access to a channel. The processing circuitry may be further configured to encode, for transmission during the TXOP, a trigger frame (TF) to indicate that a plurality of stations (STAs) are to transmit uplink sounding frames. The processing circuitry may be further configured to decode the uplink sounding frames multiplexed in a first orthogonal frequency division multiple access (OFDMA) signal received during the TXOP. The processing circuitry may be further configured to encode, for transmission during the TXOP, downlink sounding frames multiplexed in a second OFDMA signal. The processing circuitry may be further configured to decode uplink location measurement reports (LMRs) multiplexed in a third OFDMA signal received during the TXOP, wherein the uplink LMRs may include per-STA timing information for the uplink sounding frames and the downlink sounding frames. The processing circuitry may be further configured to determine location measurements for the STAs based at least partly on the per-STA timing information included in the uplink LMRs.

In Example 2, the subject matter of Example 1, wherein the processing circuitry may be further configured to encode, for transmission during the TXOP, downlink LMRs multiplexed in a fourth OFDMA signal, wherein the downlink LMRs include the location measurements.

In Example 3, the subject matter of one or any combination of Examples 1-2, wherein the location measurements for the STAs are based on distances between the AP and the STAs or angles of arrival between the AP and the STAs.

In Example 4, the subject matter of one or any combination of Examples 1-3, wherein the per-STA timing information of a particular STA of the plurality is based at least partly on: a transmission time of the uplink sounding frame from the particular STA, and a reception time of the downlink sounding frame for the particular STA at the particular STA.

In Example 5, the subject matter of one or any combination of Examples 1-4, wherein the processing circuitry further configured to determine the location measurement for the particular STA based at least partly on: a difference between the reception time of the downlink sounding frame for the particular STA at the particular STA and the transmission time of the uplink sounding frame from the particular STA, and a difference between a transmission time, at the AP, of the downlink sounding frame for the particular STA and a reception time, at the AP, of the uplink sounding frame from the particular STA.

In Example 6, the subject matter of one or any combination of Examples 1-5, wherein the processing circuitry may be further configured to determine a transmit power to be used by a particular STA of the plurality based at least partly on a previously received uplink frame from the particular STA.

In Example 7, the subject matter of one or any combination of Examples 1-6, wherein the TF is a first TF. The processing circuitry may be further configured to encode, for transmission, a second TF to schedule the uplink LMRs.

In Example 8, the subject matter of one or any combination of Examples 1-7, wherein the first TF may be a Trigger Frame for Location (TFL).

The first TF may include a TF type parameter that indicates a TF type from a group of candidate TF types that includes at least the TFL.

In Example 9, the subject matter of one or any combination of Examples 1-8, wherein the channel may comprise multiple resource units (RUs). The first TF may include first RU allocation information for one or more of the STAs for the uplink sounding waveforms of the first OFDMA signal. The second TF may include second RU allocation information for one or more of the STAs for the uplink LMRs of the third OFDMA signal.

In Example 10, the subject matter of one or any combination of Examples 1-9, wherein the uplink sounding frames may comprise training symbols for uplink channel state information (CSI) estimation. The downlink sounding frames may comprise training symbols for downlink CSI estimation.

In Example 11, the subject matter of one or any combination of Examples 1-10, wherein the location measurements may be determined as part of a multi-user (MU) location measurement. The TF is a second TF. The processing circuitry may be further configured to encode, for transmission, a first TF to initiate the MU location measurement. The processing circuitry may be further configured to decode service requests for the MU location measurement from one or more STAs of the plurality of STAs. The processing circuitry may be further configured to encode, for transmission, an MU acknowledgement (ACK) frame that indicates reception of the service requests.

In Example 12, the subject matter of one or any combination of Examples 1-11, wherein the first TF may be a Trigger Frame for Random Access Service Request (TFR SR). The channel may comprise multiple resource units (RUs). The TFR SR may be configurable to allocate at least a first RU to a particular associated STA for a service request from the particular associated STA. The TFR SR may be further configurable to allocate at least a second RU for contention based transmission of service requests by unassociated STAs.

In Example 13, the subject matter of one or any combination of Examples 1-12, wherein the AP may be arranged to operate in accordance with a wireless local area network (WLAN) protocol.

In Example 14, the subject matter of one or any combination of Examples 1-13, wherein the processing circuitry may be further configured to store the location measurements for the STAs in the memory. The processing circuitry may be further configured to determine a modulation and coding scheme (MCS) for a particular STA based at least partly on the location measurement of the particular STA.

In Example 15, the subject matter of one or any combination of Examples 1-14, wherein the processing circuitry may include a baseband processor to determine the location measurements for the STAs.

In Example 16, the subject matter of one or any combination of Examples 1-15, wherein the apparatus may further include a transceiver to receive the first and second OFDMA signals and to transmit the MU ACK frame.

In Example 17, a non-transitory computer-readable storage medium may store instructions for execution by one or more processors to perform operations for communication by an access point (AP). The operations may configure the one or more processors to contend for a transmission opportunity (TXOP) to obtain access to a channel. The operations may further configure the one or more processors to encode, for transmission, a trigger frame (TF) to initiate a multi-user (MU) location measurement during the TXOP. The operations may further configure the one or more processors to decode service requests for the MU location measurement from a plurality of stations (STAs), the service requests multiplexed in a first orthogonal frequency division multiple access (OFDMA) signal. The operations may further configure the one or more processors to encode, for transmission, an MU acknowledgement (ACK) frame that indicates reception of the service requests. The operations may further configure the one or more processors to decode, from the STAs, uplink sounding frames that include per-STA timing information for the service requests and the MU ACK frame, the uplink sounding frames multiplexed in a second OFDMA signal. The operations may further configure the one or more processors to determine location measurements for the STAs based at least partly on the per-STA timing information included in the uplink sounding frames.

In Example 18, the subject matter of Example 17, wherein the location measurements for the STAs may be based on distances between the AP and the STAs or angles of arrival between the AP and the STAs. The per-STA timing information of a particular STA of the plurality may be based at least partly on a transmission time of the service request from the particular STA, and a reception time of the MU ACK frame at the particular STA.

In Example 19, the subject matter of one or any combination of Examples 17-18, wherein the operations may further configure the one or more processors to encode, for transmission, downlink sounding frames that include the determined location measurements for the STAs, the downlink sounding frames multiplexed in a third OFDMA signal.

In Example 20, the subject matter of one or any combination of Examples 17-19, wherein the uplink sounding frames may further include uplink sounding waveforms. The processing circuitry may be further configured to determine per-STA channel state information (CSI) based on the uplink sounding waveforms. The downlink sounding frames may include the per-STA CSI and further include downlink sounding waveforms.

In Example 21, the subject matter of one or any combination of Examples 17-20, wherein the uplink sounding frames may further include uplink location measurement reports (LMRs) that include the per-STA timing information.

In Example 22, the subject matter of one or any combination of Examples 17-21, wherein the TF and the MU ACK frame may be encoded for transmission during the TXOP. The first and second OFDMA signals may be received during the TXOP.

In Example 23, a method of sounding at a station (STA) may comprise decoding a trigger frame (TF) that indicates that a plurality of stations (STAs) are to transmit uplink sounding frames during a transmission opportunity (TXOP) obtained by an access point (AP). The method may further comprise encoding, for transmission during the TXOP, an uplink sounding frame multiplexed in a first orthogonal frequency division multiple access (OFDMA) signal, the uplink sounding frame comprising training symbols for uplink channel state information (CSI) estimation. The method may further comprise decoding a downlink sounding frame comprising training symbols for downlink CSI estimation, the downlink sounding frame multiplexed in a second OFDMA signal received during the TXOP. The method may further comprise encoding, for transmission during the TXOP, an uplink location measurement report (LMR) that includes timing information for the transmission of the uplink sounding frame and the downlink sounding frames. The method may further comprise decoding a downlink LMR received during the TXOP, wherein the downlink LMR includes a location measurement for the STA based at least partly on the timing information included in the uplink LMR.

In Example 24, the subject matter of Example 23, wherein the uplink LMR may be multiplexed in a third OFDMA signal. The downlink LMR may be multiplexed in a fourth OFDMA signal.

In Example 25, an apparatus of a station (STA) may comprise memory. The apparatus may further comprise processing circuitry. The processing circuitry may be configured to decode a trigger frame (TF) received during a transmission opportunity (TXOP) obtained by an access point (AP). The processing circuitry may be further configured to encode, for transmission and in response to the TF, a service request for a location measurement of the STA as part of a multi-user (MU) location measurement by the AP. The service request may be multiplexed in a first orthogonal frequency division multiple access (OFDMA) signal. The processing circuitry may be further configured to decode an MU acknowledgement (ACK) frame that indicates reception of the service request. The processing circuitry may be further configured to encode, for transmission, an uplink sounding frame that includes timing information based at least partly on a transmission time of the service request and a reception time of the MU ACK frame. The uplink sounding frame may be multiplexed in a second OFDMA signal. The processing circuitry may be further configured to decode a downlink sounding frame that includes the location measurement for the STA. The location measurement may be based on the timing information.

In Example 26, the subject matter of Example 25, wherein the downlink sounding frame may be multiplexed in a third OFDMA signal.

In Example 27, the subject matter of one or any combination of Examples 25-26, wherein the TF is a first TF. The processing circuitry may be further configured to decode a second TF. The service request may be encoded for transmission in a first resource unit (RU) of channel resources indicated by the first TF. The uplink sounding frame may be encoded for transmission in a second RU of the channel resources indicated by the second TF.

In Example 28, an apparatus of an access point (AP) may comprise memory. The apparatus may further comprise processing circuitry. The processing circuitry may be configured to contend for a transmission opportunity (TXOP) to obtain access to a channel. The processing circuitry may be further configured to encode, for transmission during the TXOP, a trigger frame (TF) to indicate that a plurality of stations (STAs) are to transmit uplink sounding frames. The processing circuitry may be further configured to decode the uplink sounding frames multiplexed in a first orthogonal frequency division multiple access (OFDMA) signal received during the TXOP. The processing circuitry may be further configured to encode, for transmission during the TXOP, downlink sounding frames multiplexed in a second OFDMA signal.

In Example 29, the subject matter of Example 28, wherein the processing circuitry may be further configured to decode uplink location measurement reports (LMRs) multiplexed in a third OFDMA signal received during the TXOP. The uplink LMRs may include per-STA timing information for the uplink sounding frames and the downlink sounding frames. The processing circuitry may be further configured to determine location measurements for the STAs based at least partly on the per-STA timing information included in the uplink LMRs.

In Example 30, an apparatus of an access point (AP) may comprise means for contending for a transmission opportunity (TXOP) to obtain access to a channel. The apparatus may further comprise means for encoding, for transmission, a trigger frame (TF) to initiate a multi-user (MU) location measurement during the TXOP. The apparatus may further comprise means for decoding service requests for the MU location measurement from a plurality of stations (STAs), the service requests multiplexed in a first orthogonal frequency division multiple access (OFDMA) signal. The apparatus may further comprise means for encoding, for transmission, an MU acknowledgement (ACK) frame that indicates reception of the service requests. The apparatus may further comprise means for decoding, from the STAs, uplink sounding frames that include per-STA timing information for the service requests and the MU ACK frame, the uplink sounding frames multiplexed in a second OFDMA signal. The apparatus may further comprise means for determining location measurements for the STAs based at least partly on the per-STA timing information included in the uplink sounding frames.

In Example 31, the subject matter of Example 30, wherein the location measurements for the STAs may be based on distances between the AP and the STAs or angles of arrival between the AP and the STAs. The per-STA timing information of a particular STA of the plurality may be based at least partly on a transmission time of the service request from the particular STA, and a reception time of the MU ACK frame at the particular STA.

In Example 32, the subject matter of one or any combination of Examples 30-31, wherein the apparatus may further comprise means for encoding, for transmission, downlink sounding frames that include the determined location measurements for the STAs, the downlink sounding frames multiplexed in a third OFDMA signal.

In Example 33, the subject matter of one or any combination of Examples 30-32, wherein the uplink sounding frames may further include uplink sounding waveforms. The apparatus may further comprise means for determining per-STA channel state information (CSI) based on the uplink sounding waveforms. The downlink sounding frames may include the per-STA CSI and further include downlink sounding waveforms.

In Example 34, the subject matter of one or any combination of Examples 30-33, wherein the uplink sounding frames may further include uplink location measurement reports (LMRs) that include the per-STA timing information.

In Example 35, the subject matter of one or any combination of Examples 30-34, wherein the TF and the MU ACK frame may be encoded for transmission during the TXOP. The first and second OFDMA signals may be received during the TXOP.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a first station (STA), the apparatus comprising:
   memory; and processing circuitry, configured to:
      decode a first trigger frame (TF) from a second STA, the first TF indicating a first resource unit (RU) for the first STA to transmit a control frame to request to participate in ranging measurements;
      encode, for transmission to the second STA, the control frame within the first RU, the transmission of the control frame indicating that the first STA is requesting to participate in the ranging measurements;
      decode a second TF from the second STA, the second TF indicating a second RU for the first STA to transmit an uplink frame to the second STA, wherein the second TF indicates a trigger type of a plurality of trigger types, and wherein the trigger type indicates that the second TF is of type sounding;
      in response to the trigger type indicating that the second TF is of type sounding, configure the first STA to transmit the uplink frame to the second STA in accordance with the second RU;
      after transmission of the uplink frame, decode a downlink frame from the second STA; and
      decode a downlink location measurement report (LMR) from the second STA, wherein the downlink LMR comprises an indication of a time when the uplink frame was received at the second STA and an indication of a time when the downlink frame was transmitted from the second STA.

2. The apparatus of claim 1, wherein the first TF, the second TF and the downlink LMR are received by the first STA within a same transmission opportunity (TXOP).

3. The apparatus of claim 1, wherein the processing circuitry is further configured to:
decode a third TF, the third TF indicating a third RU for the first STA to transmit an uplink LMR to the second STA, the third TR received from the second STA after receipt of the downlink LMR from the second station.

4. The apparatus of claim 3, wherein the processing circuitry is further configured to:
encode the uplink LMR for transmission to the first STA in accordance with the third RU.

5. The apparatus of claim 4, wherein the uplink LMR is encoded to comprise a time when the uplink frame was transmitted by the first STA and a time when the downlink frame was received by the first STA.

6. The apparatus of claim 1, wherein decode the first TF from the second STA, the first TF indicating the first RU for the first STA to transmit the control frame to request to participate in the ranging measurement further comprises:
decode the first TF from the second STA, the first TF indicating the first RU for the first STA to transmit simultaneously with other STAs the control frame to request to participate in the ranging measurements.

7. The apparatus of claim 1, wherein the trigger type is a second trigger type and wherein the first TF indicates a second trigger type, the second trigger type indicating that the second TF is of type polling.

8. The apparatus of claim 1, wherein the first STA and second STA are each configured to operate in accordance with one or more of:
Institute of Electrical and Electronic Engineers (IEEE) 802.11az, IEEE 802.11ax, and 802.11.

9. The apparatus of claim 1, wherein the second STA is an access point or a station operating as an access point.

10. The apparatus of claim 1, wherein the processing circuitry is further configured to:
determine a location of the first STA based on the time when the uplink sounding frame was received at the second STA, the time when the downlink sound frame was transmitted, a time when the uplink sounding frame was transmitted, and a time when the downlink sounding frame was by the second STA.

11. The apparatus according to claim 10, wherein the processing circuitry includes a baseband processor to determine the location of the first STA.

12. The apparatus according to claim 1, wherein the processing circuitry is further configured to:
associate with the second STA, wherein the first TF comprises an association identification (AID) of the first STA, the AID identifying the first RU as being allocated to the first STA by the second STA.

13. The apparatus of claim 1, wherein the processing circuitry is further configured to:
determine a transmit power to be used to transmit the control frame based on measurements of signals from receiving the first TF.

14. The apparatus according to claim 1, wherein the apparatus further includes a transceiver coupled to the memory.

15. The apparatus of claim 1, wherein the processing circuitry is further configured to:
configure the first STA to transmit the control frame within the first RU in accordance with orthogonal frequency division multiple access (OFDMA).

16. The apparatus of claim 1, wherein the second RU indicates one or more spatial streams, and wherein configure the first STA to transmit the uplink sounding frame to the second STA in accordance with the second RU further comprises:
configure the first STA to transmit the uplink sounding frame to the second STA in accordance with the second RU on the one or more spatial streams in accordance with multi-user (MU) multiple-input multiple output (MIMO)(MU-MIMO).

17. A non-transitory computer-readable storage medium that stores instructions for execution by one or more processors to perform operations for communication by a first station (STA), the operations to configure the one or more processors to:
decode a first, trigger frame (TF) from a second STA, the first TF indicating a first resource unit (RU) for the first STA to transmit a control frame to request to participate in ranging measurements;
encode, for transmission to the second STA, the control frame within the first RU, the transmission of the control frame indicating that the first STA is requesting to participate in the ranging measurements,
decode a second TF from the second STA, the second TF indicating a second RU for the first STA to transmit an uplink frame to the second STA, wherein the second TF indicates a trigger type of a plurality of trigger types, and wherein the trigger type indicates that the second TF is of type sounding;
in response to the trigger type indicating that the second TF is of type sounding, configure the first STA to transmit the uplink frame to the second STA in accordance with the second RU;
after transmission of the uplink frame, decode a downlink frame from the second STA; and
decode a downlink location measurement report (LMR) from the second STA, wherein the downlink LMR comprises an indication of a time when the uplink frame was received at the second STA and an indication of a time when the downlink frame was transmitted from the second STA.

18. The non-transitory computer-readable storage medium of claim 17, wherein the first TF, the second TF and the downlink LMR are received by the first STA within a same transmission opportunity (TXOP).

19. An apparatus of an access point (AP), the apparatus comprising:
memory; and processing circuitry, configured to:
encode a first trigger frame (TF) for a plurality of stations (STAs), the first TF indicating first resource units (RUs) for the plurality of STAs to transmit control frames to request to participate in a ranging, the first RUs indicating subcarriers for the plurality of STAs to transmit a control frame in accordance with orthogonal frequency division multiple access (OFDMA);
decode in accordance with the first RUs control frames from the plurality of stations;
encode a second TF for transmission to the plurality of STAs, the second TF indicating second RUs for the plurality of STAs to transmit uplink sounding packets to the AP, the second RUs indicating for each of the plurality of STAs one or more spatial streams to transmit uplink sounding frame in accordance with multi-user (MU) multiple-input multiple-output (MIMO) (MU-MIMO), wherein the second TF includes a TF type field that indicates a TF type from a group of candidate TF types, and wherein the TF type indicates that the second TF is of type sounding;

decode the uplink sounding frames from the plurality of STAs in accordance with the second RUs; and encode downlink location measurement report (LMRs) for the plurality of STAs, wherein the downlink LMRs comprise times when the uplink sounding frames were received at the AP and times when the downlink sounding frames were transmitted from the AP.

20. The apparatus according to claim 19, wherein the apparatus further includes a transceiver coupled to the memory.

\* \* \* \* \*